United States Patent
Meschke et al.

(10) Patent No.: US 12,065,372 B2
(45) Date of Patent: Aug. 20, 2024

(54) FLUID FORMING A GLASS COMPONENT FOR A PORTABLE ELECTRONIC DEVICE

(71) Applicant: Apple Inc., Cupertino, CA (US)

(72) Inventors: Andrew J. Meschke, Cupertino, CA (US); Thomas Johannessen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 106 days.

(21) Appl. No.: 17/553,228

(22) Filed: Dec. 16, 2021

(65) Prior Publication Data

US 2022/0194841 A1 Jun. 23, 2022

Related U.S. Application Data

(60) Provisional application No. 63/154,159, filed on Feb. 26, 2021, provisional application No. 63/126,906, filed on Dec. 17, 2020.

(51) Int. Cl.
*C03B 23/03* (2006.01)

(52) U.S. Cl.
CPC ................. *C03B 23/0302* (2013.01)

(58) Field of Classification Search
CPC ................................. C03B 23/0302
USPC ....................................... 428/174
See application file for complete search history.

(56) References Cited

U.S. PATENT DOCUMENTS

| | | |
|---|---|---|
| 2,795,084 A | 6/1957 | Littleton |
| 3,410,673 A | 11/1968 | Marusak |
| 3,433,611 A | 3/1969 | Kubican |
| 3,464,880 A | 9/1969 | Rinehart |
| 3,737,294 A | 6/1973 | Dumbaugh, Jr. et al. |
| 3,746,526 A | 7/1973 | Giffon |
| 3,899,315 A | 8/1975 | Siegmund |
| 4,054,895 A | 10/1977 | Ham et al. |
| 4,070,211 A | 1/1978 | Haran et al. |
| 4,209,229 A | 6/1980 | Rittler |
| 4,339,300 A | 7/1982 | Noble et al. |
| 4,735,917 A | 4/1988 | Flatley et al. |
| 4,849,299 A | 7/1989 | Loth et al. |
| 5,122,177 A | 6/1992 | Yoshizama et al. |
| 5,173,453 A | 12/1992 | Beall et al. |
| 5,273,553 A | 12/1993 | Hoshi et al. |

(Continued)

FOREIGN PATENT DOCUMENTS

| | | |
|---|---|---|
| CN | 101475300 | 7/2009 |
| CN | 103986803 | 8/2013 |

(Continued)

OTHER PUBLICATIONS

Machine_English_translation_CN_108285263_A; Zhunga, Y.; Production method of curved glass; Jul. 17, 2018; EPO; whole document (Year: 2023).*

(Continued)

*Primary Examiner* — Tahseen Khan
(74) *Attorney, Agent, or Firm* — Brownstein Hyatt Farber Schreck, LLP

(57) ABSTRACT

Techniques for making glass components for electronic devices are disclosed. The techniques disclosed can be used to shape a glass workpiece to form a three-dimensional glass component, such as a glass cover member. Glass components and enclosures and electronic devices including the glass components are also disclosed.

14 Claims, 12 Drawing Sheets

(56) References Cited

U.S. PATENT DOCUMENTS

| | | | |
|---|---|---|---|
| 5,378,255 A | 1/1995 | Ito et al. |
| 6,055,053 A | 4/2000 | Lesniak |
| 6,067,005 A | 5/2000 | DeVolpi |
| 6,169,256 B1 | 1/2001 | Hanahara |
| 6,406,769 B1 | 6/2002 | Delabre et al. |
| 6,809,278 B2 | 10/2004 | Tsubaki |
| 6,928,224 B2 | 8/2005 | Beall et al. |
| 7,115,827 B2 | 10/2006 | Tseng |
| 7,166,909 B2 | 1/2007 | Moriaga et al. |
| 7,240,519 B2 | 7/2007 | Schwartz et al. |
| 7,459,199 B2 | 12/2008 | Skeen |
| 7,497,093 B2 | 3/2009 | Rosenflanz |
| 7,507,918 B2 | 3/2009 | Kazama |
| 7,799,158 B2 | 9/2010 | Yokoyama et al. |
| 7,902,474 B2 | 3/2011 | Mittleman |
| 7,915,556 B2 | 3/2011 | Ou |
| 7,943,953 B2 | 5/2011 | Sakamoto et al. |
| 7,966,785 B2 | 6/2011 | Zadesky et al. |
| 8,003,217 B2 | 8/2011 | Rosenflanz |
| 8,050,019 B2 | 11/2011 | Wennemer |
| 8,092,737 B2 | 1/2012 | Chang et al. |
| 8,212,455 B2 | 7/2012 | Yura et al. |
| 8,277,704 B2 | 10/2012 | Matsushima et al. |
| 8,379,159 B2 | 2/2013 | Hsu |
| 8,431,849 B2 | 4/2013 | Chen |
| 8,446,264 B2 | 5/2013 | Tanase |
| 8,665,160 B2 | 3/2014 | Uttermann et al. |
| 8,717,513 B2 | 5/2014 | Park et al. |
| 8,783,065 B2 | 7/2014 | Schillert et al. |
| 8,840,997 B2 | 9/2014 | Koyama et al. |
| 8,898,824 B2 | 12/2014 | Neidich et al. |
| 9,001,503 B1 | 4/2015 | Hibino |
| 9,030,440 B2 | 5/2015 | Pope |
| 9,069,198 B2 | 6/2015 | Kim et al. |
| 9,110,230 B2 | 8/2015 | Koch et al. |
| 9,125,298 B2 | 9/2015 | Russell-Clarke |
| 9,134,547 B2 | 9/2015 | McCabe et al. |
| 9,140,522 B1 | 9/2015 | Miller et al. |
| 9,154,678 B2 | 10/2015 | Kwong et al. |
| 9,193,625 B2 | 11/2015 | Bookbinder et al. |
| 9,232,672 B2 | 1/2016 | Kwong |
| 9,242,889 B2 | 1/2016 | Yamakaji et al. |
| 9,249,045 B2 | 2/2016 | Gabel et al. |
| 9,263,209 B2 | 2/2016 | Chen |
| 9,302,937 B2 | 4/2016 | Gulati et al. |
| 9,321,677 B2 | 4/2016 | Chang et al. |
| 9,359,251 B2 | 6/2016 | Bookbinder et al. |
| 9,375,900 B2 | 6/2016 | Tsuchiya et al. |
| 9,390,930 B2 | 7/2016 | Rogers et al. |
| 9,392,706 B2 | 7/2016 | Yoo et al. |
| 9,429,997 B2 | 8/2016 | Myers et al. |
| 9,474,174 B2 | 10/2016 | Motohashi |
| 9,516,149 B2 | 12/2016 | Wright et al. |
| 9,522,836 B2 | 12/2016 | Gulati et al. |
| 9,524,413 B2 | 12/2016 | Kim |
| 9,632,537 B2 | 4/2017 | Memering et al. |
| 9,674,322 B2 | 6/2017 | Motohashi et al. |
| 9,678,540 B2 | 6/2017 | Memering et al. |
| 9,697,409 B2 | 7/2017 | Myers |
| 9,718,727 B2 | 8/2017 | Bookbinder et al. |
| 9,728,349 B2 | 8/2017 | Huang |
| 9,840,435 B2 | 12/2017 | Ohara et al. |
| 9,846,473 B1 | 12/2017 | Kalscheur et al. |
| 9,870,880 B2 | 1/2018 | Zercoe |
| 9,890,074 B2 | 2/2018 | Liu |
| 9,897,574 B2 | 2/2018 | Roussev et al. |
| 9,902,138 B2 | 2/2018 | Edwards |
| 9,902,641 B2 | 2/2018 | Hall et al. |
| 9,941,074 B2 | 4/2018 | Tu |
| 9,946,302 B2 | 4/2018 | Franklin et al. |
| 9,963,374 B2 | 5/2018 | Jouanno et al. |
| 10,133,156 B2 | 11/2018 | Pilliod et al. |
| 10,141,133 B2 | 11/2018 | Bae |
| 10,146,982 B2 | 12/2018 | Hsu |
| 10,189,228 B2 | 1/2019 | Couillard et al. |
| 10,206,298 B2 | 2/2019 | Memering et al. |
| 10,286,631 B2 | 5/2019 | Alder et al. |
| 10,318,783 B2 | 6/2019 | Kang |
| 10,324,496 B2 | 6/2019 | Kwong et al. |
| 10,357,945 B2 | 7/2019 | Beall et al. |
| 10,425,994 B2 | 9/2019 | Weiss et al. |
| 10,494,860 B1 | 12/2019 | Jones et al. |
| 10,513,455 B2 | 12/2019 | Cook et al. |
| 10,611,666 B2 | 4/2020 | Jones et al. |
| 10,694,010 B2 | 6/2020 | Jones et al. |
| 10,702,211 B2 | 7/2020 | Clavelle et al. |
| 10,800,141 B2 | 10/2020 | Bartlow et al. |
| 10,827,635 B1 | 11/2020 | Limarga et al. |
| 10,875,277 B2 | 12/2020 | Aoki et al. |
| 10,899,660 B2 | 1/2021 | Luzzato et al. |
| 10,917,505 B2 | 2/2021 | Jones et al. |
| 10,919,270 B2 | 2/2021 | Oh et al. |
| 10,986,744 B2 | 4/2021 | Yeum et al. |
| 11,066,322 B2 | 7/2021 | Jones et al. |
| 11,109,500 B2 | 8/2021 | Shannon et al. |
| 11,192,823 B2 | 12/2021 | Li et al. |
| 11,199,929 B2 | 12/2021 | Poole et al. |
| 11,372,137 B2 | 6/2022 | Gu et al. |
| 11,419,231 B1 | 8/2022 | Lancaster-Larocque et al. |
| 2003/0040346 A1 | 2/2003 | Fukuda et al. |
| 2003/0062490 A1 | 4/2003 | Fujieda |
| 2004/0003627 A1 | 1/2004 | Hashima |
| 2004/0041504 A1 | 3/2004 | Ozolins |
| 2004/0105026 A1 | 6/2004 | Campbell et al. |
| 2005/0135724 A1 | 6/2005 | Helvajian |
| 2005/0176506 A1 | 8/2005 | Goto |
| 2008/0049980 A1 | 2/2008 | Castaneda |
| 2008/0316687 A1 | 12/2008 | Richardson et al. |
| 2009/0040737 A1 | 2/2009 | Shimura |
| 2009/0104409 A1 | 4/2009 | Derriey |
| 2010/0013786 A1 | 1/2010 | Nishikawa et al. |
| 2010/0108486 A1 | 5/2010 | Yoshida |
| 2010/0127420 A1 | 5/2010 | Dannoux |
| 2010/0148996 A1 | 6/2010 | Wang |
| 2010/0263708 A1 | 10/2010 | Reichart et al. |
| 2010/0279068 A1 | 11/2010 | Cook et al. |
| 2010/0285310 A1 | 11/2010 | Izutani et al. |
| 2010/0330814 A1 | 12/2010 | Yokota |
| 2011/0019123 A1 | 1/2011 | Prest et al. |
| 2011/0019354 A1 | 1/2011 | Prest et al. |
| 2011/0038115 A1 | 2/2011 | Halkosaari |
| 2011/0041987 A1 | 2/2011 | Hori et al. |
| 2011/0177300 A1 | 7/2011 | Hankey et al. |
| 2011/0253520 A1 | 10/2011 | Lim |
| 2012/0052271 A1 | 3/2012 | Gomez et al. |
| 2012/0176760 A1 | 7/2012 | Cohen et al. |
| 2012/0206669 A1 | 8/2012 | Kim |
| 2012/0212890 A1 | 8/2012 | Hoshino et al. |
| 2012/0229424 A1 | 9/2012 | Behles et al. |
| 2012/0236526 A1 | 9/2012 | Weber |
| 2012/0250273 A1 | 10/2012 | Kuo |
| 2012/0327325 A1 | 12/2012 | Park et al. |
| 2013/0128434 A1 | 5/2013 | Yamamoto et al. |
| 2013/0236699 A1 | 9/2013 | Prest et al. |
| 2014/0093702 A1 | 4/2014 | Kitajima |
| 2014/0116090 A1 | 5/2014 | Lee et al. |
| 2014/0151320 A1 | 6/2014 | Chang et al. |
| 2014/0272298 A1 | 9/2014 | Memering et al. |
| 2014/0285956 A1 | 9/2014 | Russell-Clarke et al. |
| 2014/0311882 A1 | 10/2014 | Terashita |
| 2014/0335322 A1 | 11/2014 | Luo et al. |
| 2015/0002993 A1 | 1/2015 | Lee |
| 2015/0030834 A1 | 1/2015 | Morey et al. |
| 2015/0030859 A1 | 1/2015 | Rogers et al. |
| 2015/0044445 A1 | 2/2015 | Garner et al. |
| 2015/0077830 A1 | 3/2015 | Lin et al. |
| 2015/0093581 A1 | 4/2015 | Murata et al. |
| 2015/0104618 A1 | 4/2015 | Hayashi et al. |
| 2015/0122406 A1 | 5/2015 | Fisher et al. |
| 2015/0163382 A1 | 6/2015 | Kwong et al. |
| 2015/0165548 A1 | 6/2015 | Marjanovic et al. |
| 2015/0202854 A1 | 7/2015 | Tsuchiya et al. |
| 2015/0210588 A1 | 7/2015 | Chang et al. |
| 2015/0212247 A1 | 7/2015 | Borrelli et al. |

(56) References Cited

U.S. PATENT DOCUMENTS

| | | |
|---|---|---|
| 2015/0232366 A1 | 8/2015 | Fredholm et al. |
| 2015/0241732 A1 | 8/2015 | Kim et al. |
| 2015/0245514 A1 | 8/2015 | Choung |
| 2015/0274572 A1 | 10/2015 | Wada et al. |
| 2015/0299036 A1 | 10/2015 | Ukrainczyk et al. |
| 2016/0028931 A1 | 1/2016 | Kwong et al. |
| 2016/0137550 A1 | 5/2016 | Murata et al. |
| 2016/0224142 A1 | 8/2016 | Yang et al. |
| 2016/0270247 A1 | 9/2016 | Jones et al. |
| 2016/0357294 A1 | 12/2016 | Czeki et al. |
| 2016/0377768 A1 | 12/2016 | Wilson et al. |
| 2017/0027068 A1 | 1/2017 | Dane et al. |
| 2017/0059749 A1 | 3/2017 | Wakatsuki et al. |
| 2017/0066223 A1 | 3/2017 | Notsu et al. |
| 2017/0282503 A1 | 10/2017 | Peng et al. |
| 2017/0300114 A1 | 10/2017 | Matsuyuki et al. |
| 2017/0305788 A1 | 10/2017 | Nikulin |
| 2017/0334770 A1 | 11/2017 | Luzzato et al. |
| 2017/0340518 A1 | 11/2017 | Logunov et al. |
| 2017/0364172 A1 | 12/2017 | Kim et al. |
| 2018/0009697 A1 | 1/2018 | He et al. |
| 2018/0024274 A1 | 1/2018 | Rogers et al. |
| 2018/0067212 A1 | 3/2018 | Wilson et al. |
| 2018/0086026 A1 | 3/2018 | Nguyen et al. |
| 2018/0086663 A1 | 3/2018 | Luzzato et al. |
| 2018/0088399 A1 | 3/2018 | Fukushi et al. |
| 2018/0125756 A1 | 5/2018 | Gerrish et al. |
| 2018/0126704 A1 | 5/2018 | Zhang et al. |
| 2018/0134606 A1 | 5/2018 | Wagner et al. |
| 2018/0154615 A1 | 6/2018 | Dohn et al. |
| 2018/0237325 A1 | 8/2018 | Li et al. |
| 2018/0282207 A1 | 10/2018 | Fujii et al. |
| 2018/0304588 A1 | 10/2018 | Harris et al. |
| 2018/0304825 A1 | 10/2018 | Mattelet et al. |
| 2018/0326704 A1 | 11/2018 | Harris et al. |
| 2018/0370843 A1 | 12/2018 | Gross et al. |
| 2019/0022979 A1 | 1/2019 | Luzzato et al. |
| 2019/0030861 A1 | 1/2019 | Bellman et al. |
| 2019/0033144 A1 | 1/2019 | Andrews et al. |
| 2019/0037690 A1 | 1/2019 | Wilson et al. |
| 2019/0100457 A1 | 4/2019 | Luzzato et al. |
| 2019/0134944 A1 | 5/2019 | Dawson-Elli |
| 2019/0160787 A1 | 5/2019 | Bartlow et al. |
| 2019/0161402 A1 | 5/2019 | Harris et al. |
| 2019/0177215 A1 | 6/2019 | Jin et al. |
| 2019/0219463 A1 | 7/2019 | Orihara et al. |
| 2019/0263708 A1 | 8/2019 | Bookbinder et al. |
| 2019/0293838 A1 | 9/2019 | Haba et al. |
| 2020/0014780 A1 | 1/2020 | Jones et al. |
| 2020/0039186 A1 | 2/2020 | Yuan et al. |
| 2020/0055281 A1 | 2/2020 | Yoon et al. |
| 2020/0095159 A1 | 3/2020 | Marshall et al. |
| 2020/0301527 A1 | 9/2020 | Poole et al. |
| 2020/0323440 A1 | 10/2020 | Vule et al. |
| 2020/0339472 A1 | 10/2020 | Yoon et al. |
| 2020/0346525 A1 | 11/2020 | Mannheim Astete et al. |
| 2020/0369560 A1 | 11/2020 | Takeda et al. |
| 2020/0379143 A1 | 12/2020 | Gu et al. |
| 2020/0389991 A1 | 12/2020 | Shannon et al. |
| 2020/0407266 A1 | 12/2020 | Suzuki et al. |
| 2021/0009469 A1 | 1/2021 | Marshall et al. |
| 2021/0014992 A1 | 1/2021 | Limarga et al. |
| 2021/0016547 A1 | 1/2021 | Bartlow et al. |
| 2021/0033757 A1 | 2/2021 | Wilson et al. |
| 2021/0072789 A1 | 3/2021 | Rogers et al. |
| 2021/0212229 A1 | 7/2021 | Yeum et al. |
| 2021/0303031 A1 | 9/2021 | Poole et al. |
| 2021/0361233 A1 | 11/2021 | Wilson et al. |
| 2022/0009823 A1 | 1/2022 | Dejneka et al. |
| 2022/0117094 A1 | 4/2022 | Prest et al. |
| 2022/0193825 A1 | 6/2022 | Van Dyke et al. |
| 2022/0194840 A1 | 6/2022 | Meschke et al. |
| 2023/0014168 A1 | 1/2023 | Poole et al. |

FOREIGN PATENT DOCUMENTS

| | | |
|---|---|---|
| CN | 105765722 | 7/2016 |
| CN | 106407345 | 10/2016 |
| CN | 106341962 | 1/2017 |
| CN | 106485275 | 3/2017 |
| CN | 108017263 | 5/2018 |
| CN | 108285263 | 7/2018 |
| CN | 108285263 A * | 7/2018 |
| CN | 108545917 | 9/2018 |
| CN | 108600419 | 9/2018 |
| CN | 108632510 | 10/2018 |
| CN | 109502958 | 3/2019 |
| CN | 110857865 | 3/2020 |
| CN | 111655478 | 9/2020 |
| CN | 215010334 | 12/2021 |
| DE | 102016107630 | 10/2017 |
| JP | S6042176 | 9/1985 |
| JP | S6271215 | 5/1987 |
| JP | H03122036 | 5/1991 |
| KR | 2020063653 | 6/2020 |
| TW | 201912602 | 4/2019 |
| WO | WO2010/077845 | 7/2010 |
| WO | WO2012/027660 | 3/2012 |
| WO | WO2012/074983 | 6/2012 |
| WO | WO2014/022356 | 2/2014 |
| WO | WO2014/022681 | 2/2014 |
| WO | WO2015/031420 | 3/2015 |
| WO | WO2015/095089 | 6/2015 |
| WO | WO2016/065118 | 4/2016 |
| WO | WO2017/196800 | 11/2017 |
| WO | WO2019/199791 | 10/2019 |
| WO | WO2019213364 | 11/2019 |

OTHER PUBLICATIONS

Aben et al., "A New Method for Tempering Stress Measurement in Glass Panels," Estonian Journal of Engineering, vol. 19, No. 4, pp. 292-297, 2013.

Bourhis, "Production Control of Residual Stresses," Glass Mechanics and Technology, Second Edition, pp. 236-243, 2014.

Decourcelle, et al., "Controlling Anisotropy," Conference Proceedings, All Eyes on Glass, Glass Performance Days, Tampere, Finland, Jun. 28-30, 2017.

Mao et al., "Fabrication and characterization of 20 nm planar nanofluidic channels by glass-glass and glass-silicon bonding," www.rsc.org/loc, 8 pages, Jun. 30, 2005.

Moriceau et al., "Overview of recent direct wafer bonding advances and applications," Advances in Natural Sciences: Nanoscience and Nanotechnology, vol. 1, No. 043004, 11 pages, 2010.

Ungaro et al., "Using phase-corrected Bessel beams to cut glass substrates with a chamfered edge," Applied Optics, vol. 60, No. 3, p. 714, Dec. 10, 2020.

Dudutis et al., Bessel beam asymmetry control for glass dicing applications, Procedia CIRP 74, pp. 333-338, 2018.

Gottmann et al., "Microcutting and Hollow 3D Microstructures in Glasses by In-Volume Selective Laser-induced Etching," Journal of Laser Micro / Nanoengineering, vol. 8, No. 1, pp. 15-18, Jan. 2013.

Jenne et al., "High-quality Tailored-edge Cleaving Using Aberration-corrected Bessel-like Beams," arXiv:2010.10226v1 [physics.optics], May 8, 2018.

Author Unknown, "Monolithic," definition of monolithic by Merriam-Webster, 3 pages, Sep. 6, 2015.

Author Unknown, "Handbook for Interior Designers," 3 pages, 1998.

* cited by examiner

FLUID FORMING A GLASS COMPONENT FOR A PORTABLE ELECTRONIC DEVICE

CROSS-REFERENCE TO RELATED APPLICATION(S)

This application is a nonprovisional application of and claims the benefit of U.S. Provisional Patent Application No. 63/154,159, filed Feb. 26, 2021 and titled "Fluid Forming a Glass Component for a Portable Electronic Device," and of U.S. Provisional Patent Application No. 63/126,906, filed Dec. 17, 2020 and titled "Fluid Forming a Glass Component for a Portable Electronic Device," the disclosures of which are hereby incorporated by reference in their entireties.

FIELD

The described embodiments relate generally to techniques for making glass components for electronic devices. More particularly, the present embodiments relate to techniques in which a fluid such as a liquid metal or a molten salt is used to shape a glass workpiece.

BACKGROUND

Traditional electronic devices include glass parts such as cover sheets and the like. Some glasses used for cover sheets are hard and resist scratching. However, these glasses can also have high molding temperatures. Therefore, mechanical techniques such as grinding and polishing have traditionally been used to shape the cover sheets formed from these glasses.

SUMMARY

Techniques for forming glass components for electronic devices are disclosed herein. In embodiments, the techniques disclosed herein can be used to form a glass workpiece to produce a three-dimensional glass component, such as a glass cover member. The disclosure also relates to glass components and enclosures and electronic devices including the glass components.

In some examples, the shape of the glass workpiece is modified using a forming technique in which a portion of the glass workpiece is molded between a mold tool and a heated fluid such as a molten metal or a molten salt. The resulting molded glass workpiece may then be finished to produce the glass component.

The glass workpiece may be assembled with a first mold tool and a second mold tool to form an assembly comprising a fluid seal. A first region of the glass workpiece may be molded between the first mold tool and the heated fluid. In some cases, the fluid seal is formed between the second mold tool and a second region of the glass workpiece. The first region of the glass workpiece may be a central region of the glass workpiece and the second region of the glass workpiece may be a peripheral region of the glass workpiece.

The forming techniques disclosed herein can enable production of glass components whose shape defines an undercut. The forming techniques disclosed herein can be especially useful for molding glasses which become soft enough to be molded only at relatively high temperatures. For example, the molding techniques disclosed herein can be useful for aluminosilicate glasses and borosilicate glasses.

The disclosure provides a method for making a glass component for an electronic device, the method comprising heating each of a first and a second mold tool to a first temperature. The method further comprises positioning a glass workpiece between the first mold tool and the second mold tool, the second mold tool defining an opening positioned over the glass workpiece. The method also comprises securing the first mold tool with the second mold tool to form a sealed interface at a parting line between the first mold tool and the second mold tool. The method additionally comprises introducing a forming liquid at a second temperature into the opening and pressurizing the forming liquid causing the glass workpiece to deform into a recess feature of the first mold tool, the second temperature being greater than the first temperature. The method further comprises depressurizing and removing the forming liquid from the opening, separating the first mold tool and the second mold tool and removing a molded glass workpiece, and finishing the molded glass workpiece to produce the glass component.

The disclosure also provides a method for making a glass component for an electronic device, the method comprising heating a first mold tool and a second mold tool of a mold to a first temperature and positioning a glass workpiece within the first mold tool and the second mold tool, a portion of the glass workpiece defining a fluid seal between the first mold tool and the second mold tool. The method further comprises introducing a heated fluid into the mold, the heated fluid in contact with a first surface of the glass workpiece, the heated fluid at a second temperature, greater than the first temperature, and pressurizing the heated fluid thereby causing a second surface of the glass workpiece opposite to the first surface to deform into a recess feature of the second mold tool, thereby forming a molded glass workpiece. In addition, the method comprises depressurizing and draining the heated fluid from the mold, removing the molded glass workpiece from the mold, and finishing the molded glass workpiece to produce the glass component.

In addition, the disclosure provides a glass component for an electronic device, the glass component defining a planar rear portion and a curved side portion extending from the planar rear portion. The curved side portion defines an undercut and an opening to the glass component.

BRIEF DESCRIPTION OF THE DRAWINGS

The disclosure will be readily understood by the following detailed description in conjunction with the accompanying drawings, wherein like reference numerals designate like elements.

Figure 1A:
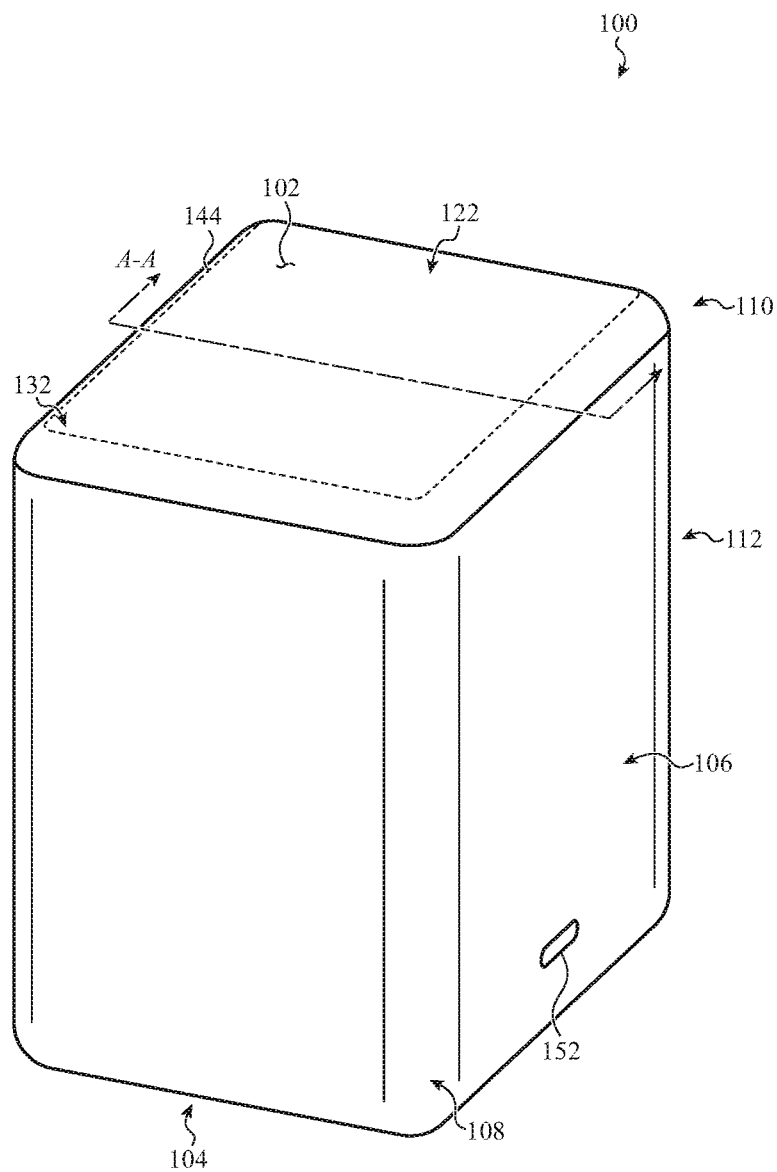
FIG. 1A depicts an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to techniques for making glass components for electronic devices. In embodiments, the techniques disclosed herein can be used to shape a glass workpiece to produce a three-dimensional glass component. By the way of example, the three-dimensional glass component may be a glass cover member or a glass housing.

In some examples, the shape of the glass workpiece is modified using a forming technique in which a portion of the glass workpiece is molded between a mold tool and a heated fluid such as a molten metal or a molten salt. This heated fluid may also be referred to herein as a forming fluid or a forming liquid. The resulting molded glass workpiece may then be finished to produce the glass component.

In some cases, the glass workpiece may be assembled with a first mold tool and a second mold tool. The first mold tool may define a recess feature and the second mold tool may define an opening which is positioned over the glass workpiece, an example of which is shown in FIG. 4. The opening provides a conduit for the heated fluid to enter the upper mold tool during the operation of forming the glass workpiece as described in further detail below with respect to FIG. 3.

The glass workpiece may be assembled with the first mold tool and the second mold tool to form an assembly comprising a fluid seal. A first region of the glass workpiece may be molded between the first mold tool and the heated fluid. In some examples, the fluid seal is formed between the second mold tool and a second region of the glass workpiece. This example is not limiting, and alternate seal configurations are described below. The first region of the glass workpiece may be a central region of the glass workpiece and the second region of the glass workpiece may be a peripheral region of the glass workpiece.

The molding techniques disclosed herein can be especially useful for molding glasses which become soft enough to be molded only at relatively high temperatures. For example, the molding techniques disclosed herein can be useful for aluminosilicate glasses and borosilicate glasses.

The disclosure also relates to glass components and enclosures and electronic devices including the glass components. The molding techniques disclosed herein can enable formation of glass components whose shapes define an undercut. Such shapes can be difficult to achieve with other techniques such as sagging a glass sheet into a mold or forming a glass sheet between a core mold and a cavity mold. The techniques described herein can be used to produce a variety of glass components, such as glass cover members and other types of glass enclosure components. Although the following description provides examples of glass components which can be used as cover members and housings for electronic devices, the techniques described herein are generally applicable to glass components for electronic devices.

These and other embodiments are discussed below with reference to FIGS. 1A-11. However, those skilled in the art will readily appreciate that the detailed description given herein with respect to these figures is for explanatory purposes only and should not be construed as limiting.

FIG. 1A depicts an example electronic device 100. In embodiments, the electronic device 100 has an enclosure 110 that includes a glass cover member or other glass component produced by a technique as described herein. In some embodiments, the electronic device 100 may be a digital media player, a portable media player, and/or a home control device. In additional embodiments, the electronic device 100 may be a computing device (e.g., a desktop, notebook, laptop, or tablet computing device), a mobile telephone (also referred to as a mobile phone), an input device, or another type of portable electronic device. As shown in FIG. 1A, the electronic device 100 has a form factor in which the height of the device is greater than both the width and the length of the top face. In addition, the width and the length of the top face of the electronic device 100 are depicted as similar in size. The form factor shown in the example of FIG. 1A is exemplary rather than limiting and in additional examples the height may be less than the width and/or the length, the width and the length of the top face may differ, or both.

As shown in FIG. 1A, the electronic device 100 comprises an enclosure 110 including an enclosure component 112 and a cover 122. The cover 122 may define at least a portion of a front surface 102 of the electronic device and may be referred to as a front cover. In some examples, the enclosure further includes another cover which defines at least a portion of a rear surface 104 of the electronic device and which may be referred to as a rear cover. In embodiments, the cover 122 includes a glass component produced by a technique as described herein. In additional examples, a cover may define another external surface of the electronic device, such as a rear surface, a side surface, or two or more of front, rear, and side surfaces of the electronic device.

Figure 1B:
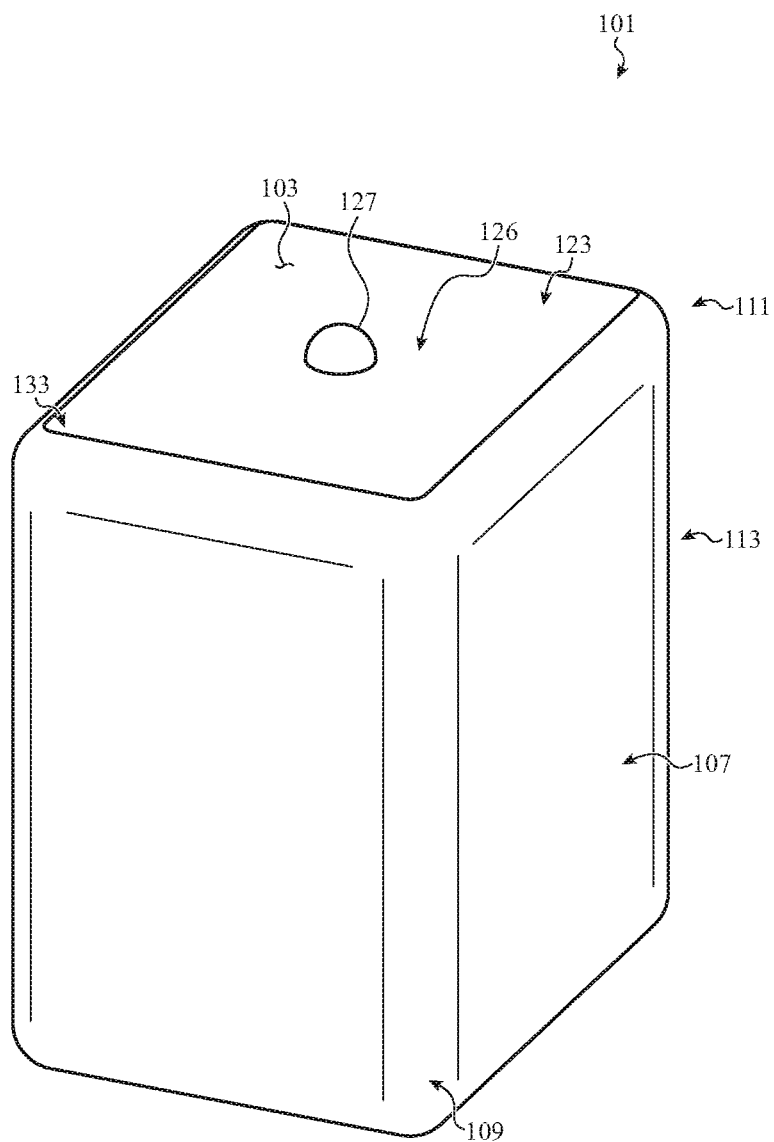
FIG. 1B depicts another example electronic device.
Figure 2:
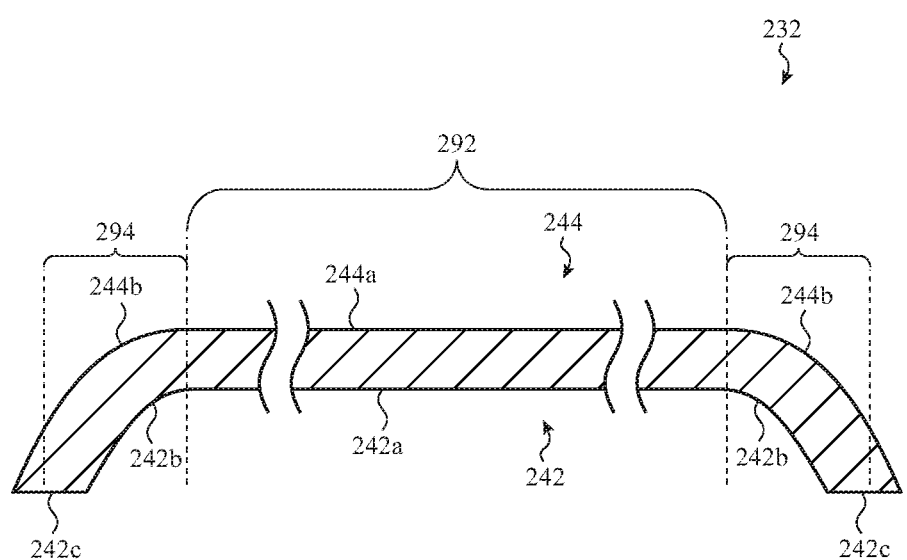
FIG. 2 shows a simplified cross-section view of an example glass component made using a forming technique.

In some embodiments, a cover of the electronic device 100, such as the cover 122, is three-dimensional (e.g., non-planar) or defines a contoured profile. For example, the cover 122 may define a peripheral portion that is not coplanar with respect to a central portion. An example of a three-dimensional shape defining a generally planar central portion and a peripheral portion extending out of the plane defined by the central portion is shown in FIG. 2. The peripheral portion may, for example, define a side wall of an electronic device enclosure, while the central portion defines a front surface (which may define a transparent window that overlies a display). As an additional example, a cover may define a surface protrusion (an example of which is shown in FIG. 1B), a surface recess, and/or one or more curved surfaces. A glass component such as a glass cover member 132 may be shaped similarly to its respective cover.

Figure 11:
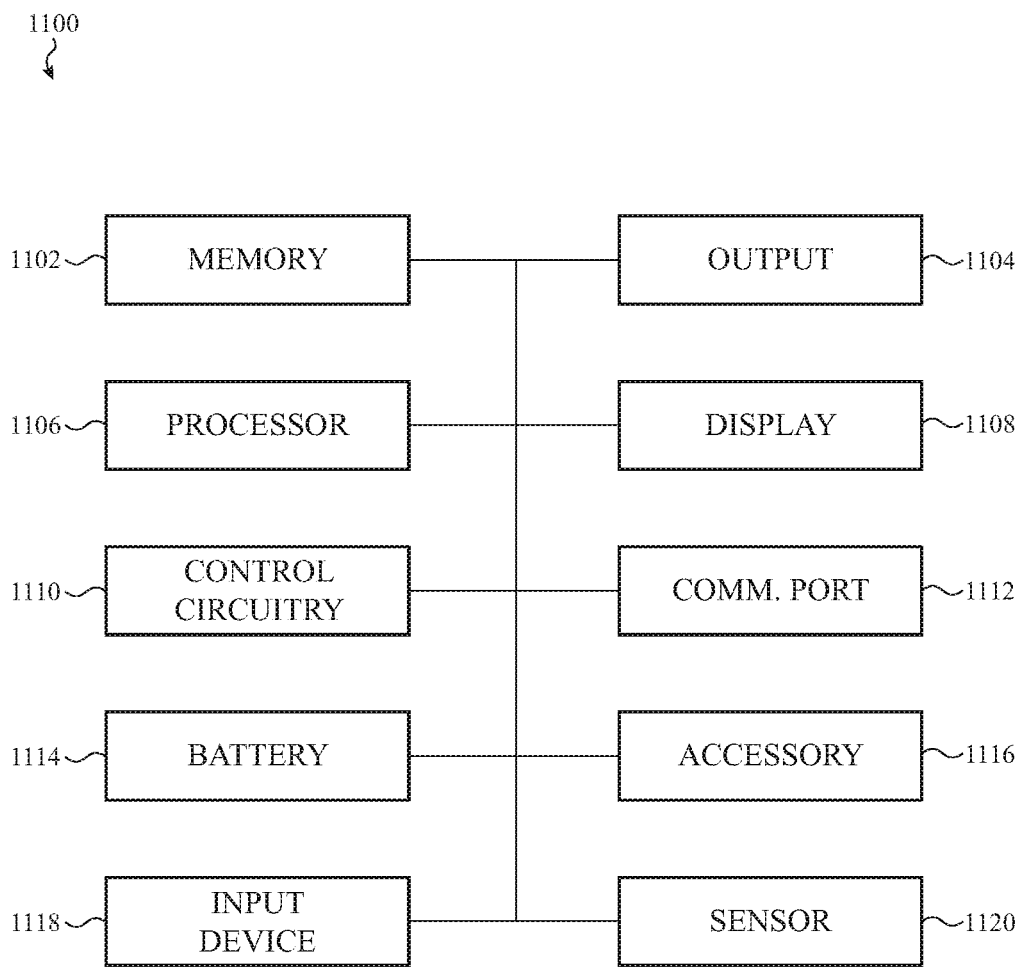
FIG. 11 shows a block diagram of a sample electronic device that can incorporate a glass component.

In the example of FIG. 1A, the cover 122 is positioned over a display 144 that is at least partially enclosed or surrounded by the enclosure component 112 of the enclosure 110. The cover 122 may define a transparent region for viewing the display. Alternately or additionally, the cover 122 may be integrated with or coupled to a touch sensor that is configured to detect or estimate a location of a touch along the exterior surface of the cover 122. The touch sensor may include an array of capacitive electrodes that are positioned below the cover 122 and, in some instances, may be integrated with the display. In additional examples, the cover 122 may be integrated with or coupled to an electronic device component which provides an alternate or an additional functional characteristic. Capacitive and/or other functional characteristics may be associated with planar and/or non-planar regions of the cover 122. The additional description of displays and sensors provided with respect to FIG. 11 is generally applicable herein and is not repeated here.

The cover 122 includes a cover member 132, which may be referred to as a front cover member. The cover member 132 may extend laterally across the cover 122, such as substantially across the width and the length of the cover 122. The cover member 132 may have a thickness from about 0.3 mm to about 0.75 mm or from about 0.5 mm to about 1 mm. In some embodiments the cover member 132 is a glass component (a glass cover member), which may be produced by a technique as described herein. The additional description of glass components provided herein, including the description provided with respect to FIGS. 2, 3A, 3B, 9, and 10, is generally applicable herein. In additional embodiments, the cover member 132 may be formed of one or more materials other than glass, and in some cases may be a glass ceramic cover member. In some embodiments, the cover 122 may define one or more holes extending though its thickness, with the hole positioned over another device component such as a microphone, speaker, an optical camera or sensor component, or the like.

The cover 122 may include one or more coatings applied to the cover member. For example, an anti-reflection and/or smudge-resistant coating may be applied to an exterior surface of the cover member. As an additional example, a coating designed to produce a visual effect, such as an opaque mask coating, may be applied to an interior surface of the cover member. In a further example, the cover 122 may include a laminate material (e.g., in sheet form) applied along an interior surface of the cover 122 to provide structural support/reinforcement, an electrical function, a thermal function, and/or a visual effect. The laminate material may conform to a three-dimensional portion of the cover.

As shown in FIG. 1A, the enclosure 110 further includes an enclosure member 112, which for simplicity may also be referred to herein as a housing. The cover 122 may be coupled to the enclosure member 112. For example, the cover 122 may be coupled to the enclosure member with an adhesive, a fastener, an engagement feature, or a combination thereof.

In embodiments, the enclosure member 112 at least partially defines a side surface 106 of the electronic device 100. In the example of FIG. 1A, the enclosure member 112 defines all four sides of the electronic device 100. The enclosure member 112 of FIG. 1A also defines corner regions 108. FIG. 1A includes vertical lines to indicate approximate boundaries of the corner regions 108. One or more of the corner regions may define a compound curvature. In additional embodiments, an enclosure member 112 may be positioned internal to the electronic device 100 and one or more of a front cover 122 or a rear cover may define all or most of the side surface of the electronic device. In the example of FIG. 1A, the electronic device 100 includes an input device 152, which may be a button or any other input device described with respect to FIG. 11. The enclosure component 112 may define an opening to accommodate the input device. In additional examples, an enclosure component may define one or more openings in a side surface to allow (audio) input or output from a device component such as a microphone or speaker, to provide a window for transmission and/or receipt of a wireless signal, and/or to accommodate an electrical port or connection.

In some embodiments, the enclosure component 112 may be formed from a single material, and may be a monolithic component. For example, the enclosure component 112 may be formed from a glass material, a metal material, a ceramic material, a glass ceramic material, or a polymer material. In some cases, the enclosure component is a glass component as described herein. In additional embodiments, an enclosure component may include multiple members. For example, the enclosure component may include one or more metal members, one or more glass members, or one or more glass ceramic members. In some cases, one or more of the glass members may be a glass component as described herein. In some cases, an enclosure member is formed from a series of metal segments that are separated by dielectric segments that provide electrical isolation between adjacent metal segments. For example, a dielectric segment may be provided between a pair of adjacent metal segments. One or more of the metal segments may be coupled to internal circuitry of the electronic device 100 and may function as an antenna for sending and receiving wireless communication. The dielectric segments may be formed from one or more dielectric materials such as a polymer, a glass, or a ceramic material. As referred to herein, a component or member formed from a particular material, such as a glass or a metal material, may also include a relatively thin coating of a different material along one or more surfaces, such as an anodization layer, a physical vapor deposited coating, a paint coating, a primer coating (which may include a coupling agent), or the like.

In addition to a display and/or a touch screen, the electronic device 100 may include additional components. These additional components may comprise one or more of a processing unit, control circuitry, memory, an input/output device, a power source (e.g., a battery), a charging assembly (e.g., a wireless charging assembly), a network communication interface, an accessory, a sensor, or another component that is part of a wireless communication system (e.g., an antenna, a transmitter, receiver, transceiver, or the like). Components of a sample electronic device are discussed in more detail below with respect to FIG. 11 and the description provided with respect to FIG. 11 is generally applicable herein.

FIG. 1B shows another example of an electronic device 101. In embodiments, the electronic device 101 has an enclosure 111 that includes a glass cover member or other glass component produced by a technique as described herein. The electronic device 101 may be any of the electronic devices previously described with respect to the electronic device 100 and may have any of the form factors previously described with respect to that device.

As shown in FIG. 1B, the enclosure 111 includes a cover 123. The cover 123 includes a cover member 133. The cover member 133 may define at least a portion of a front surface 103 of the electronic device and may be referred to as a front cover member. The cover member 133 may extend laterally across the cover 123, such as substantially across the width and the length of the cover 123. In some embodiments the cover member 133 is a glass component (a glass cover member), which may be produced by a technique as described herein. In additional embodiments, the cover member 133 may be formed of one or more materials other than glass, and in some cases may be a glass ceramic cover member. The glass cover member 133 may be shaped similarly to the cover 123.

In the example of FIG. 1B, the cover 123 defines a protruding portion 127 which protrudes with respect to another portion 126 of the cover. The protruding portion 127 may also be referred to herein as a protruding feature or simply as a feature. More generally, a glass component such as the cover member 133 may define one or more features which vary in elevation with respect to a neighboring portion or region of the glass component. A feature which is formed to a different elevation than a neighboring portion of the glass component may define a protrusion or a recess in some embodiments. In some cases, a device component such as a sensor assembly, a camera assembly, and the like may be provided under a protruding feature. The size of the feature 127 may depend at least in part on the size of a device component underlying the protruding feature. In some embodiments, a lateral dimension (e.g., a width) of the protruding feature may be from about 2 mm to about 10 mm, from about 5 mm to about 30 mm, from about 10 mm to about 20 mm, or from about 15 mm to 30 mm.

In the example of FIG. 1B, the protruding feature 127 is shown as generally curved or rounded in shape. However, this example is not limiting and in other examples a protruding feature may define a substantially plateau-shaped top. The plateau-shaped top may be substantially parallel to an exterior surface defined by an adjacent portion of the cover. The amount of protrusion or offset between the top of the protruding portion 127 and exterior surface of the adjacent portion of the cover may be from about 0.5 mm to about 1.5 mm or from about 0.75 mm to about 2 mm.

When the glass cover member 133 is shaped similarly to the cover 123, the glass cover member 133 may also define a protruding feature. In some examples, a cover member 133 that defines a protruding feature has substantially the same thickness as a neighboring portion of the cover member. In some cases, the cover member 133 is produced by reshaping a glass workpiece of substantially uniform thickness to form a protruding feature. In some examples, the resulting protruding feature may be convex on the exterior and concave on the interior of the cover member. In examples, the thickness of the cover member may be greater than about 0.3 mm and less than about 0.75 mm or greater than about 0.5 mm and less than about 1 mm in both portion 127 and portion 126 of the cover 123.

In additional examples, the cover member 133 varies in thickness. In some cases, the cover member 133 may have a greater thickness in a protruding portion than in an adjacent portion. In embodiments, the cover member 133 may have a thickness in the protruding portion 127 that is at least 10%, 25%, or 50% and up to about 250% greater than a thickness of the cover member in the portion 126 of the cover 123. In some cases, the thickness of the thicker portion of the cover 123 (including the protruding feature) is greater than about 1 mm and less than or equal to about 2 mm or about 2.5 mm. The thickness of the portion 126 of the cover 123 may be greater than about 0.3 mm and less than about 0.75 mm or greater than about 0.5 mm and less than about 1 mm.

In some embodiments, the cover 123 may define one or more holes extending though its thickness, also referred to herein as through-holes. The one or more holes may facilitate positioning of one or more device components, such as a speaker or an optical module of a camera assembly or sensor assembly. In some cases, a hole may be formed into the protruding feature 127 and a device component may extend at least partially into the hole in the protruding feature. By the way of example, the electronic device may include one or more optical modules selected from a camera module, an optical sensor module, an illumination module, and a (non-optical) sensor. In some examples, a window may be provided over the hole to protect the underlying device component. When the glass cover member 133 is shaped similarly to the cover 123, the glass cover member may also define one or more through-holes.

In some cases, the cover 123 may be integrated with or coupled to a touch sensor or another electronic device component which provides a functional characteristic to the cover. The cover 123 may include one or more coatings applied to the cover member and these coatings may be similar to the coatings previously described with respect to the cover 122. In some examples, the cover 123 may include a laminate material applied along an interior surface of the cover 123 in a similar fashion as described with respect to FIG. 1A.

The enclosure 111 of the electronic device 101 also includes an enclosure component 113. The enclosure member 113 at least partially defines a side surface 107 of the electronic device 100. In the example of FIG. 1B, the enclosure member 113 defines all four sides of the electronic device 101. The enclosure member 113 of FIG. 1B also defines corner regions 109. The enclosure member may be similar in construction and materials to the enclosure member 112 and those details are not repeated here.

In addition to a display and a camera assembly, the electronic device 101 may include additional components. For example, the electronic device may include one or more sensor assemblies and/or camera assemblies. As additional examples, the electronic device may comprise one or more of a processing unit, control circuitry, memory, an input/output device, a power source (e.g., battery), a charging assembly (e.g., a wireless charging assembly), a network communication interface, an accessory, and a sensor. Components of a sample electronic device are discussed in more detail below with respect to FIG. 11 and the description provided with respect to FIG. 11 is generally applicable herein.

FIG. 2 shows a simplified cross-section view of an example glass component 232. The glass component 232 defines a three-dimensional shape and may be an example of the glass cover member 132 of FIG. 1A. The cross-section view may be along A-A in FIG. 1A. The three-dimensional shape shown in FIG. 2 is exemplary rather than limiting and the techniques described herein can be used to produce a variety of three-dimensional shapes.

The glass component 232 may be described as defining a generally planar central portion and a peripheral portion extending from the generally planar central portion. As shown in FIG. 2, the glass component 232 includes a central portion 292 and a peripheral portion 294 which extends out of the plane defined by the central portion 292. The central portion 292 and the peripheral portion 294 are contiguous. The peripheral portion 294 shown in FIG. 2 defines an angle with respect to the generally planar central portion 292 (as seen in the cross-section view). The peripheral portion 294 may therefore be referred to herein as an angled portion. In the example of FIG. 2, the peripheral portion 294 defines an obtuse angle with respect to the generally planar central portion, but this example is not limiting, and, in some embodiments, a peripheral portion may define a ninety-degree angle or an acute angle with respect to a central portion. The three-dimensional shape shown in FIG. 2 is exemplary rather than limiting and the techniques described herein can be used to produce a variety of three-dimensional shapes, including shapes where the central portion is curved rather than planar and shapes where both the central portion and the peripheral portion are curved.

In the example of FIG. 2, the glass component 232 defines interior and exterior surfaces (242, 244) which are generally planar in a central portion of the cover and curved in a peripheral portion of the cover. As shown, the interior and exterior surfaces in the peripheral portion generally curve towards the interior of the electronic device. In other words, the curve defined by the interior and exterior surfaces in the peripheral portion is concave with respect to an interior of the electronic device. As shown in FIG. 2, the central portion 292 includes the central exterior surface 244a and the central interior surface 242a. The peripheral portion 294 includes the peripheral exterior surface 24b, the transitional interior surface 242b, and the peripheral interior surface 242c. The peripheral interior surface 242c is offset from the central interior surface 242a; the transitional interior surface 242b provides a transition between the peripheral interior surface 242c and the central interior surface 242a. The curvature and/or the curve length of the peripheral exterior surface 244b and of the transitional interior surface 242b is not limited to the example of FIG. 2 and may have a greater or lesser curvature and/or curve length. In some cases, the glass component has a wall thickness in a range from 300 microns to 2 mm.

In some cases, the glass component has a smooth surface. When the roughness of the glass component is measured by an arithmetical mean height (e.g., $R_a$ or $S_a$), one or more surfaces of the glass component may have a surface roughness greater than zero and less than about 250 nm, 150 nm, 100 nm, 50 nm, 25 nm, or 10 nm. The glass component may also have a transmittance and clarity sufficiently high enough that high resolution graphics produced by a display are not distorted.

Typically, a glass cover member or other glass component is formed from a silica-based glass material. The glass material may have a network structure, such as a silicate-based network structure. As referred to herein, a "glass cover member," a "glass component," a "glass workpiece," a "molded glass workpiece," a "glass sheet," a "glass layer," and/or a "glass piece" may include some relatively small amount of impurities or crystalline material, such as 1% or less, 2% or less, or 5% or less by weight of the member.

In some embodiments, the glass material includes an aluminosilicate glass. As used herein, an aluminosilicate glass includes the elements aluminum, silicon, and oxygen, but may further include other elements. Typically, the glass material includes an ion-exchangeable glass material, such as an alkali metal aluminosilicate glass (e.g., a lithium aluminosilicate glass). An ion-exchangeable aluminosilicate glass may include monovalent or divalent ions that compensate for charges due to replacement of silicon ions by aluminum ions. Suitable monovalent ions include, but are not limited to, alkali metal ions such as $Li^+$, $Na^+$, or $K^+$. Suitable divalent ions include alkaline earth ions such as $Ca^{2+}$ or $Mg^{2+}$. In some embodiments, the glass material includes a crystallizable glass. In some cases, a small amount of tin or other element(s) present in the forming fluid may be introduced near a surface of the glass component during the forming process.

Figure 3:
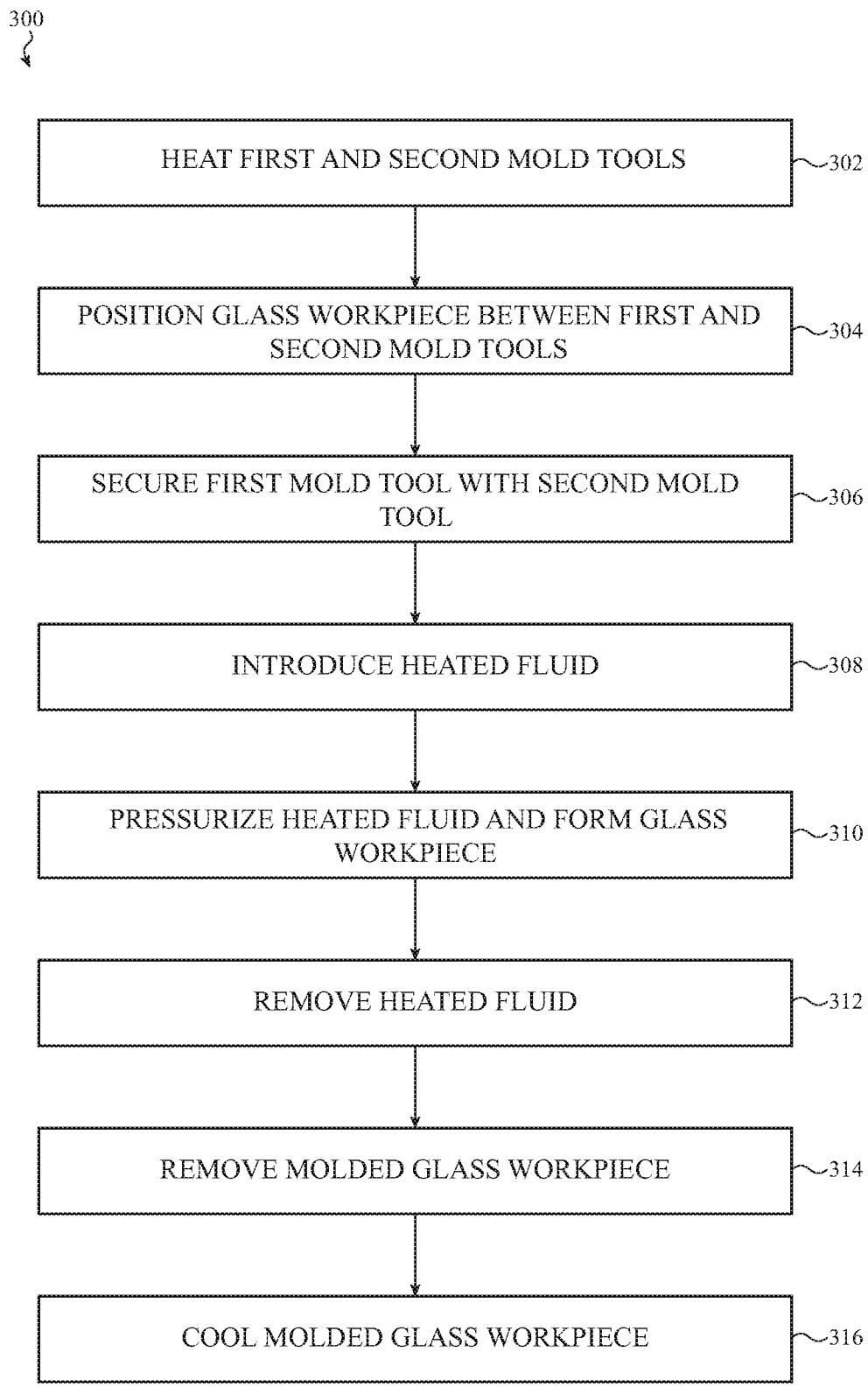
FIG. 3 shows a flowchart of a forming process for making a glass component.
Figure 4:
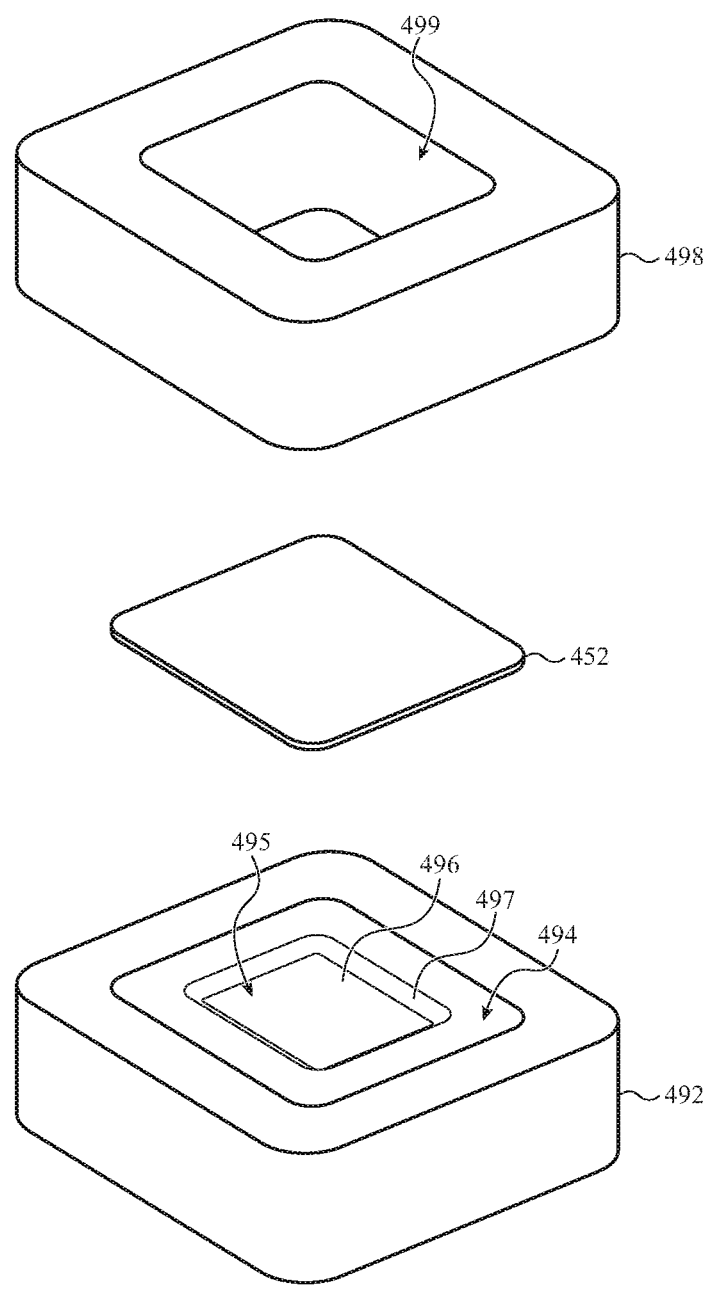
FIG. 4 schematically shows an operation of positioning a glass workpiece between two mold tools.

FIG. 3 shows a flowchart of a forming process for making a glass component by forming a glass workpiece. As described below, a forming operation changes a shape of the glass workpiece to produce a molded glass workpiece. In some cases, one or more operations, such as a finishing operation, are used to produce the glass component from the molded glass workpiece.

In some cases, the glass workpiece (which may also be referred to herein as a blank or a preform) may be a sheet of glass which is substantially flat and of substantially uniform thickness. In some examples the glass workpiece may have a thickness from about 300 microns to about 2 mm, from about 300 microns to about 1 mm, about 0.3 mm to about 0.75 mm, from about 0.5 mm to about 1 mm, or from about 0.5 mm to about 1.5 mm. In additional cases, the glass workpiece may have a non-uniform thickness and/or may have a shape other than a flat shape. For example, the shape of the glass workpiece may be engineered to facilitate the forming process. The glass workpiece may have lateral dimensions larger than those of the glass component to allow a peripheral portion of the glass workpiece to be inserted between the mold tools and to serve as a flange, as described in more detail below. The glass workpiece may be formed from any of the glass materials previously described with respect to FIG. 2. In some examples the glass workpiece may be cleaned and/or may be treated with one or more surface treatments such as etching and plasma treatment prior to placement in the mold tools.

The process 300 includes an operation 302 of heating each of the first and the second mold tools prior to positioning the glass workpiece between the first and the second mold tools. The first and the second mold tools may be preheated to a first temperature before the glass workpiece is assembled with the mold tools. In some examples, each of the first and the second mold tools may be heated to a temperature within about 75° C., 50° C., or 25° C. of the glass transition temperature for the glass workpiece. In some cases, the first and the second mold tools may be heated to a temperature from 500° C. to 600° C. In some cases, at least a portion of the first and/or the second mold tools is maintained at a temperature in this range during the forming process.

The first and the second mold tools are typically configured to withstand elevated temperatures. As examples, the first and the second mold tools may be formed from one or more materials such as high purity chromium (e.g., a purity of a least 99.95%), noble metals (e.g., Pt, Rd, Ir, or alloys thereof such as Pt—Ir), or ceramic materials such as tungsten carbide, alumina, zirconia, and the like. For example, a mold tool may be formed from chromium or a ceramic material. In some cases, a noble metal or ceramic coating is applied to the bulk chromium or ceramic of the mold tool. Examples of suitable coatings include, but are not limited to, coatings of one or more of noble metals and noble metal alloys such as Pt—Ir, oxides such as aluminum oxide, nitrides such as titanium nitride or titanium aluminum nitride, carbonitrides such as titanium carbonitride, and the like.

Figure 10:
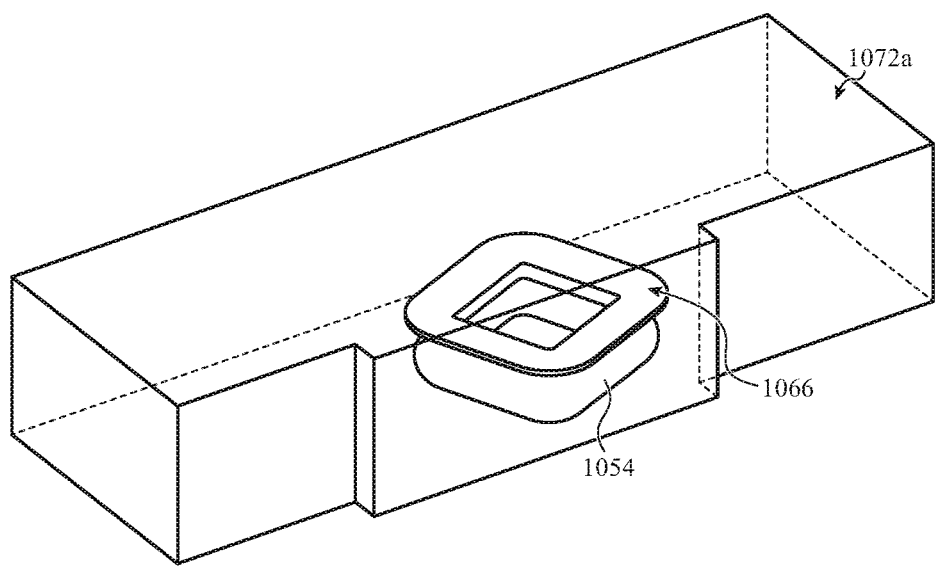
FIG. 10 shows an example of a molded glass workpiece in a portion of a mold tool.

In some cases, the first mold tool, the second mold tool, or both are multipart mold tools. For example, the second mold tool may include a mold insert as well as a holder for the mold insert, as shown in the example of FIG. 4. In some cases, the mold insert may be separable into two or more parts to facilitate removal of the molded glass workpiece from the mold insert as schematically shown in FIG. 10. More generally, the mold tool can include two or more separable parts. A parting line of a multi-part mold tool may be located at a position where the draft of the part changes. In some examples, a parting line of the mold insert or mold tool may be located along a diagonal of a molded portion of the molded glass workpiece.

The process 300 includes an operation 304 of positioning the glass workpiece with a first mold tool and a second mold tool. Alternately or additionally, the glass workpiece may be positioned between the first mold tool and the second mold tool. When the glass workpiece has a horizontal orientation the first mold tool may be a lower mold tool and the second mold tool may be an upper mold tool.

In some cases, the first mold tool may define a recess feature and the second mold tool may define an opening which is positioned over the glass workpiece. FIG. 4 shows an example of an operation of positioning a glass workpiece between two mold tools having these features. The opening provides a conduit for the heated fluid to enter the upper mold tool during the operation of forming the glass workpiece as described in further detail below with respect to the operation 308.

The process 300 includes an operation 306 of securing the first mold tool with the second mold tool. The operation 306 may form an assembly comprising the glass workpiece, the first mold tool, and the second mold tool. In some cases, the operation 306 forms a sealed interface at a parting line between the first mold tool and the second mold tool. In additional cases, a portion of the glass workpiece may at least partially define a fluid seal between the first mold tool and the second mold tool. The glass workpiece and/or an additional sealing element may define one or more seal interfaces through which the first mold tool contacts the second mold tool.

Figure 7:
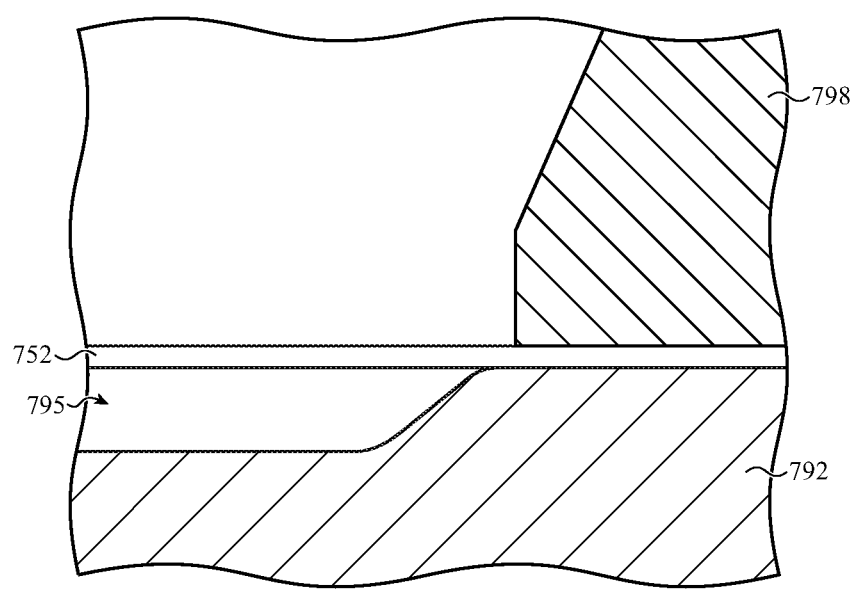
FIG. 7 shows a partial cross-section view of another sealing configuration.

The operation of securing the first mold tool with the second mold tool may comprise sealing the glass workpiece to the second mold tool. For example, the second mold tool may be compressed against the glass workpiece to limit intrusion of heated fluid between the glass workpiece and the second mold tool, as shown in the example of FIG. 7.

Figure 6A:
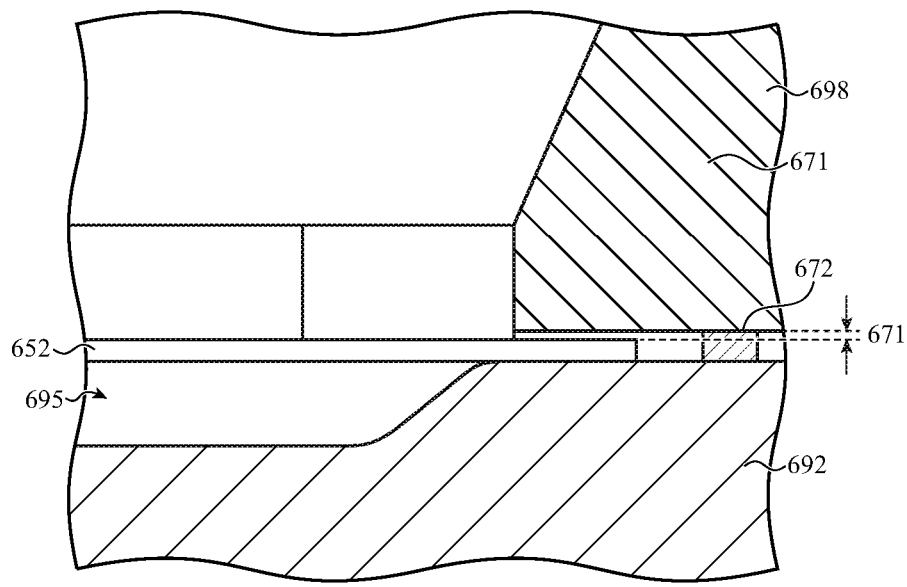
FIGS. 6A and 6B show partial cross-section views of sealing configurations.
Figure 6B:
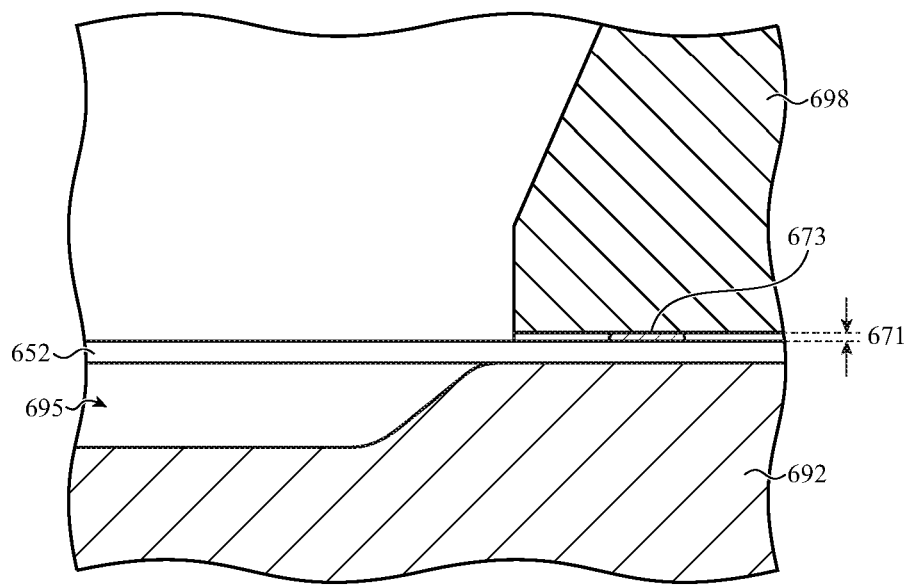

In additional examples, the assembly may further comprise a sealing element. Such a sealing element may be placed between the first mold tool and the second mold tool as shown in the example of FIG. 6A. The first mold tool may contact the second mold tool (through the sealing element) along a seal interface surrounding the glass workpiece. Alternately or additionally, a sealing element may be placed between the glass workpiece and the second mold tool as shown in the example of FIG. 6B. Sealing elements may be formed of a variety of materials including carbon or graphite. In some embodiments the sealing element slidably seals the assembly from intrusion of the heated fluid. A seal formed to limit or prevent intrusion of the heated fluid may also be referred to herein as a fluid seal.

The process 300 further includes an operation 308 of introducing a heated fluid into the mold. During the operation 308 the heated fluid may enter the second mold tool and contact the glass workpiece, as illustrated in the cross-section view of FIG. 5B. The heated fluid may be introduced in an opening in the second mold tool to mold at least a portion of the glass workpiece into a recess feature of the first mold tool.

The heated fluid is at an elevated temperature, greater than a temperature of the mold tools and the glass workpiece, when it enters the second mold tool. The heated fluid can thus heat and soften the glass workpiece. In some cases, the heated fluid when it enters the assembly may be at a temperature from a softening point to a working point of the glass workpiece or at a temperature from a working point of the glass workpiece to a melting point of the glass workpiece.

The process 300 further includes an operation 310 of pressurizing the heated fluid and forming at least a portion of the glass workpiece using a heated fluid. The operation 310 produces a molded glass workpiece having a formed or molded portion. The forming portion of the operation 310 may also be referred to herein as a reforming operation, a thermoforming operation, a molding operation, or a shaping operation and the molded glass workpiece may also be referred to herein as a reformed or a reshaped glass workpiece. In particular, the portion of the glass workpiece may be deformed between the heated fluid and the recess feature of the first mold tool. The heated fluid may contact a first surface (also referred to as a first face) of the glass workpiece and a second surface of the glass workpiece (also referred to as a second face), generally opposite the first surface, may be pressed against the recess feature of the first mold tool. The glass workpiece may be deformed by bending, by stretching, by flow, or in some cases by combinations of these deformation modes. The forming process may be completed quickly, such as in 30 seconds or less or from about 5 to about 25 seconds.

Heating the glass workpiece to a temperature about equal to a softening point of the glass workpiece may be useful when the change in shape during forming of the glass workpiece is achieved largely by bending. Heating the glass workpiece to a temperature about equal to a working point of the glass workpiece may be useful when the change in shape during forming of the glass workpiece is achieved largely by stretching but the glass workpiece retains substantially uniform thickness. Heating the glass workpiece to temperatures in a range from a working point to a melting point of the glass workpiece may be useful when the change in shape during forming of the glass workpiece is achieved largely at least in part by flow of the glass material of the glass workpiece. In cases where high shear rates cause shear thinning, adequate viscous flow may occur at lower temperatures than are otherwise possible. In some cases, the glass workpiece may be heated to a temperature from about 800° C. to about 1000° C.

The heated fluid may be pressurized to help deform the glass workpiece against the first mold tool. As examples, the heated fluid is pressurized to a pressure less than or equal to 1 MPa, less than or equal to 0.75 MPa, less than or equal to 0.5 MPa, or from 0.25 MPa to 0.75 MPa above atmospheric pressure. Suitable heated fluids include fluids which are substantially incompressible. Therefore, the heated fluid is other than a heated gas. The heated fluid may be a heated liquid capable of remaining in the liquid state at the forming temperature(s). Typically, the heated liquid is other than a conventional hydroforming fluid (e.g., other than a conventional aqueous hydroforming fluid). In some examples, the heated fluid is a molten metal material such as molten tin, a molten tin alloy or another molten alloy. In additional examples the heated fluid is a molten salt, such as a mixture of potassium nitrate, sodium nitrite, and sodium nitrate (e.g., HITEC salt), or a mixture of sodium nitrate and potassium nitrate (e.g., binary solar salt).

In some cases, a pressurized gas may be used to apply pressure to the heated fluid. For example, a pressurized gas may be introduced to a region of the heated fluid causing the glass workpiece to deform. In other cases, a tool such as a plunger may be used to apply pressure to the heated fluid. In additional embodiments, the heated fluid may be pressurized when it is introduced (so that operations 308 and 310 occur simultaneously).

In some cases, a peripheral portion of the glass workpiece may tend to move between the mold tools during the forming operation. In embodiments, movement of the peripheral portion of the glass workpiece within the mold tools is controlled at least in part by the technique used to seal the assembly against intrusion of the heated fluid between the second mold tool and the glass workpiece. In additional examples, movement of the peripheral portion of the workpiece may be influenced by modification of a surface of one or more of the mold tools and/or modification of a surface of the glass workpiece. The modifications may include one or more of a temporary or permanent coating, a texture, a gaseous cushion/slip plane, or the like. For example, a coating may be applied to all or part of a glass workpiece surface to lower the friction between the glass workpiece surface and the mold tool surface. Suitable coatings include, but are not limited to, graphite or boron nitride powder coatings or vaporizable coatings that produce a gaseous cushion between the glass workpiece surface and the mold tool surface. As an additional example, the mold tool surface may be coated to lower the friction or textured to increase the friction between the mold tool surface and the glass workpiece.

For silicate glasses, plots of viscosity versus temperature can be used to identify temperatures relevant to deformation of the glass. For example, the strain point (viscosity of about $10^{14.5}$ Poise) is the temperature at which internal stress in the glass is relieved in hours. The annealing point (viscosity of about $10^{13.2}$ to $10^{13.4}$ Poise) is the temperature at which internal stress in the glass is relieved in minutes. The glass transition temperature (viscosity of about $10^{12}$ to $10^{13}$ Poise) is the temperature at which glass transitions from a super-cooled liquid to a glassy state. The dilatometric softening point is defined by a viscosity of about $10^9$ to $10^{11}$ Poise while the Littleton softening point is defined by a viscosity of about $10^{7.6}$ Poise; a "softening point" as referred to herein may refer to either of these temperatures. The working point is defined by a viscosity of about $10^4$ Poise. The melting range may be defined by a viscosity of about $10^{1.5}$ Poise to about $10^{2.5}$ Poise.

As an example, the strain point of an aluminosilicate glass such as an alkali aluminosilicate glass may be from about 525° C. to about 575° C.; the annealing point of the aluminosilicate glass may be from about 600° C. to about 650° C., and the working point may be greater than 1000° C., such as from about 1100° C. to about 1300° C. The glass transition temperature may be from about 575° C. to about 625° C. As an additional example, the aluminosilicate glass may be configured to have a lower working temperature and glass transition temperature, such as a working temperature from about 900° C. to about 1100° C. and a glass transition temperature from about 500° C. to about 550° C.

The process 300 further includes an operation 312 of depressurizing and removing the heated fluid. The depressurizing and removing of the heating fluid may occur sequentially or simultaneously. In some cases, the heated fluid may be removed from the opening of the second mold tool. For example, the heated fluid may be removed by draining the heated fluid from the assembly of the glass workpiece and the mold tools. The operation of removing the heated fluid can help to cool the molded glass workpiece so that it can be removed from the mold tools without losing its shape. In addition, the process 300 includes an operation 314 of removing the molded glass workpiece from the first and the second mold tools.

The process 300 also includes an operation 316 of cooling the molded glass workpiece after the operation 314. The operation 316 may cool the molded glass workpiece to an ambient temperature (e.g., room temperature, about 25° C.), an ambient temperature range, or a temperature range sufficiently below a transition temperature of the glass component (e.g., a strain point or a glass transition point). The operation 316 may include one or more stages.

In some embodiments, the process 300 may include one or more additional operations which produce the glass component from the molded glass workpiece. For example, the process 300 may include one or more operations of finishing the molded glass workpiece to produce the glass component. In some cases, the one or more finishing operations include a trimming operation. In some embodiments, the molded glass workpiece includes a peripheral portion positioned between the first and the second mold tools at the end of the forming operation. During the finishing operation, at least some of this peripheral portion of the molded glass workpiece may be removed (trimmed) to achieve the desired shape of the glass component. If desired, the molded glass workpiece may also be trimmed inward of this peripheral portion. Any suitable separation techniques may be used during the trimming operation, such as a laser separation process, a mechanical separation process, or a combination thereof. The one or more finishing operations may optionally include an operation of creating a through-hole through the glass component. The operation of creating the through-hole can employ a mechanical process, a laser-based process, or a combination thereof. In additional examples, the one or more finishing operations may include cleaning, texturing, and/or polishing operations.

The process 300 may further include an annealing operation to relieve residual thermal stresses from the heating and forming operations. The annealing operation may take place after the molded glass workpiece is removed from the mold tools.

In additional examples, the process 300 may include a chemical strengthening operation. The glass component may be chemically strengthened by one or more ion exchange operations. An ion exchange operation may be included in the operations 308 and/or 310 when the heated fluid includes a suitable source of ions and/or a suitable source of ions is introduced into the cavity mold. Alternately or additionally, an ion exchange operation may take place following removal of the glass workpiece from the first and the second mold tools. During the ion exchange operation, ions present in the glass component can be exchanged for larger ions in a region extending from a surface of the glass component. The ion exchange may form a compressive stress layer (or region) extending from a surface of the glass component. In some embodiments, a compressive stress layer is formed at each of the exterior surface and the interior surface of the glass component. A tensile stress layer may be formed between these compressive stress layers.

FIG. 4 schematically shows an operation of positioning a glass workpiece between two mold tools. The glass workpiece 452 has a horizontal orientation and is positioned between a lower mold tool 492 and an upper mold tool 498. The mold tools 492 and 498 may be formed of similar materials to those previously described with respect to FIG. 3 and that description is not repeated here. The mold tool 492 may be referred to as a first mold tool and the mold tool 498 may be referred to as a second mold tool in some examples described herein.

The mold tool 492 is positioned below the glass workpiece 452. In the example of FIG. 4, the mold tool 492 includes an insert 494. The insert 494 of the mold tool 492 defines a recess 495. The recess 495 may be defined by a substantially planar recessed surface 496 and a wall surface 497 extending from the planar recessed surface. When the glass workpiece is molded against a recess 495 having this shape the molded glass workpiece may include a first portion which is a generally planar central portion and a second portion which extends from the first portion and is at least partially out of the plane defined by the first portion. For example, the second portion may be angled with respect to the generally planar central portion as previously described with respect to FIG. 2. The molded glass workpiece may also include a third portion which defines a peripheral portion of the molded glass workpiece, also referred to herein as a flange. An example of this shape, which may also be referred to as a "dish" shape, is shown in FIG. 2 and the description provided with respect to FIG. 2 is generally applicable herein. The recess shape of the mold tool 492 is exemplary rather than limiting and, in additional examples, the recess may be shaped to define a curved central portion, a protruding feature (as shown in FIG. 1B), or any of a variety of shapes of the molded glass workpiece.

The mold tool 498 is positioned above the glass workpiece 452. The mold tool 498 defines an opening 499. The opening 499 may be positioned over the glass workpiece, as shown in the cross-section views of FIGS. 5A through 7. The opening provides a conduit for the heated fluid to enter the mold tool 498 and contact the glass workpiece 452, as illustrated in the cross-section view of FIG. 5B.

Figure 5A:
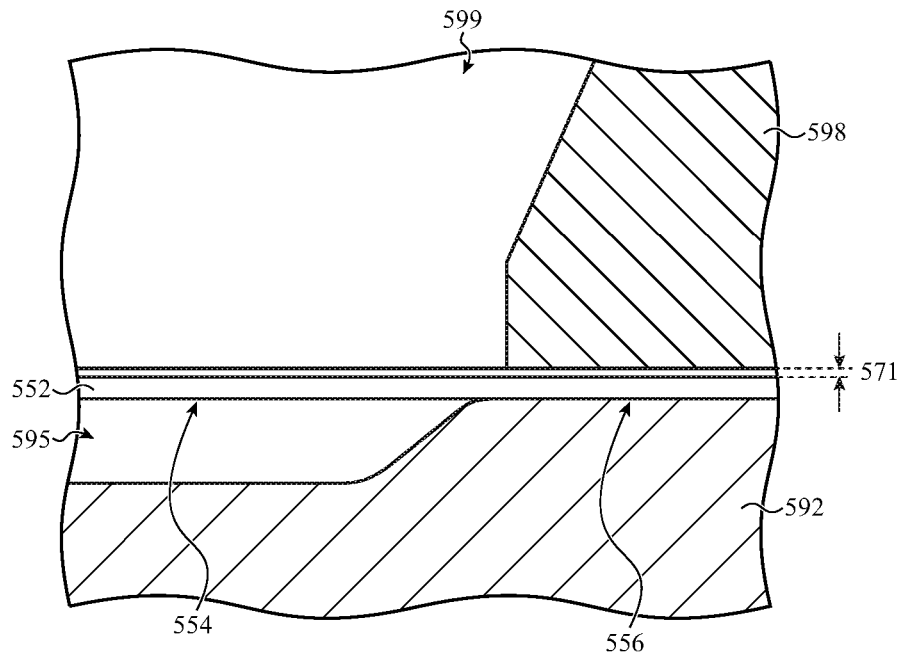
FIGS. 5A and 5B show partial cross-section views of stages in a process for making the glass component.
Figure 5B:
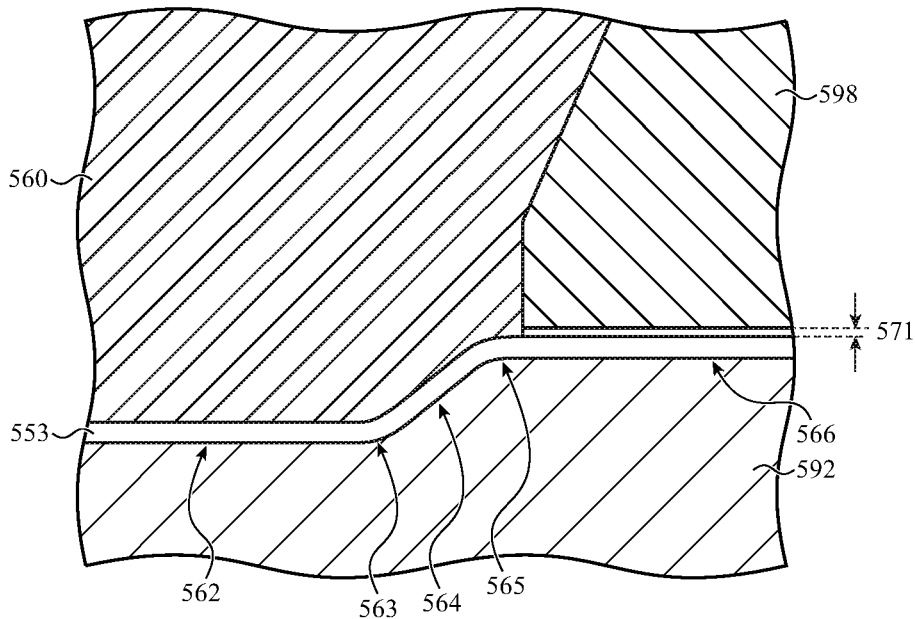

FIGS. 5A and 5B show partial cross-section views of stages in a process for making a glass component. FIG. 5A shows the glass workpiece 552 assembled with the mold tool 592 and the mold tool 598 prior to a forming operation. The glass workpiece 552 has a horizontal orientation and is positioned between the mold tool 592 and the mold tool 598. The mold tool 592 defines a recess 595. In the example of FIG. 5A, a second region 556 of the glass workpiece 552 is positioned between the mold tool 592 and the mold tool 598 and a first region 554 is positioned over the recess 595. A small gap 571 is formed between the glass workpiece 552 and the mold tool 598. This gap may allow the glass workpiece 552 to draw inwards during the forming operation.

FIG. 5B shows a molded glass workpiece 553 after the forming operation. The heated fluid 560 has deformed the glass workpiece 552 of FIG. 5A to form the molded glass workpiece 553. The molded glass workpiece 553 conforms to the recess 595 of the mold tool 592. The molded glass workpiece 553 includes a central first portion 562, a second portion 564 that is angled with respect to the first portion 562, and a third portion 566 which serves as a flange. A transition 563 between the first portion 562 and the second portion 564 and a transition 565 between the second portion 564 and the third portion 566 are also shown in FIG. 5B.

In the example of FIG. 5B, the heated fluid 560 fills the opening 599 previously shown in FIG. 5A. However, this example is not limiting and a tool such a plunger used to pressurize the heated fluid can also be present within the opening. In some cases, the gap 571 may be small enough to limit intrusion of the heated fluid 560 between the molded glass workpiece 553 and the mold tool 598 and thus slidably seal the assembly of the glass workpiece and the mold tools. In additional cases a sealing element may be provided to limit intrusion of the heated fluid 560, as shown in FIGS. 6A and 6B.

FIGS. 6A and 6B show partial cross-section views of sealing configurations. FIG. 6A shows an example of a sealing element 672 placed between the first mold tool 692 and the second mold tool 698. When this type of sealing element is used, the glass workpiece 652 is free to draw inwards during the forming process. Some movement of the glass workpiece 652 in the z direction (a vertical direction perpendicular to a plane defined by the first or second mold tools) may also occur. As shown in FIG. 6A, a small gap 671 is formed between the glass workpiece 652 and the second mold tool 698 and the first mold tool 692 defines a recess 695.

FIG. 6B shows an example of a sealing element 673 placed between the glass workpiece 652 and the second mold tool 698. With this type of sealing element, the glass workpiece 652 may have some ability to draw inwards during the forming process while movement in the z direction may be restricted. The sealing element 673 of FIG. 6B may be thin and, in some cases, may be formed of a foil such as a graphite foil. As shown in FIG. 6B, a small gap 671 is formed between the glass workpiece 652 and the second mold tool 698 and the first mold tool 692 defines a recess 695.

FIG. 7 shows a partial cross-section view of another sealing configuration. For example, the second mold tool 798 may be compressed against the glass workpiece 752 to limit intrusion of heated fluid between the glass workpiece 752 and the second mold tool 798. Compression of the second mold tool 798 against the glass workpiece 752 may also restrict movement of the glass workpiece 752 in the horizontal (x, y) and vertical (z) directions. As shown in FIG. 7, the first mold tool 792 defines a recess 795.

Figure 8:
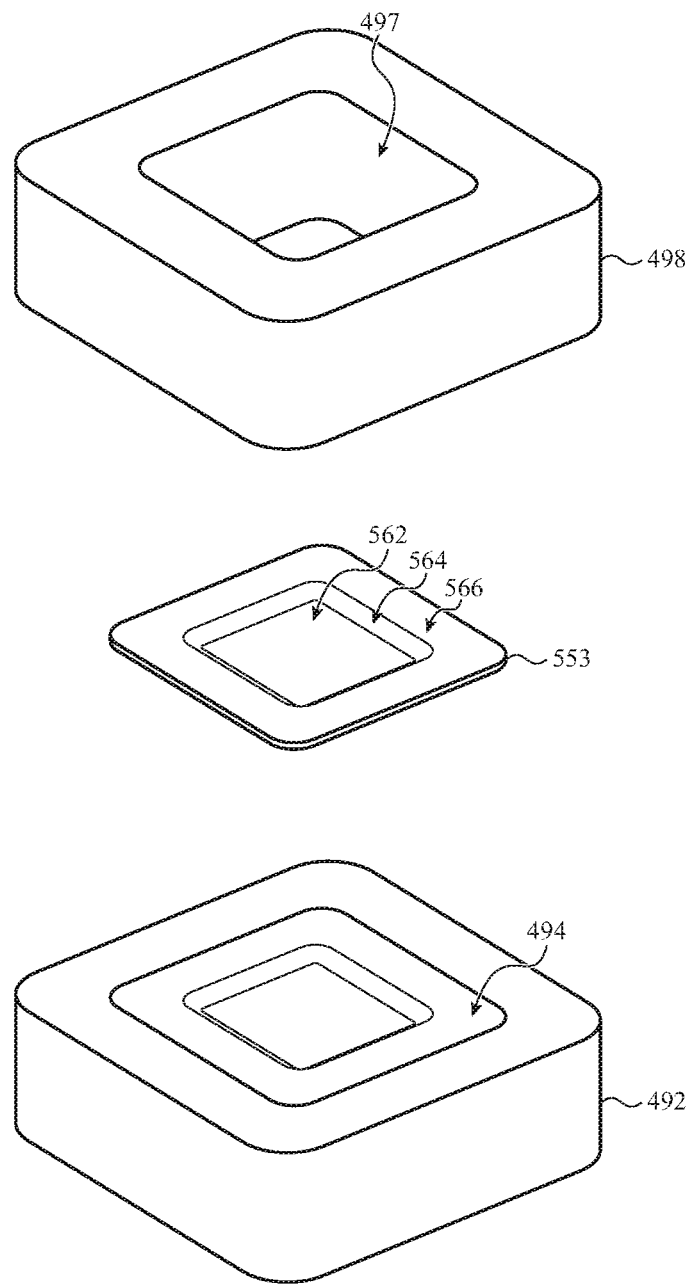
FIG. 8 schematically shows an operation of removing a molded glass workpiece from two mold tools.

FIG. 8 schematically shows an operation of removing a molded glass workpiece 553 from two mold tools 492, 498. In the example of FIG. 8, the molded glass workpiece 553 defines a central first portion 562 which is generally planar and a second portion 564 extending at an obtuse angle with respect to the central first portion, an example of which was previously shown in FIG. 2. A peripheral third portion 566 of the molded glass workpiece extends from the second portion 564 and may serve as a flange. At least part of this peripheral third portion 566 was positioned between the first and the second mold tools at the end of the forming operation. This peripheral third portion may be trimmed as desired to produce the desired shape of the glass component.

Figure 9:
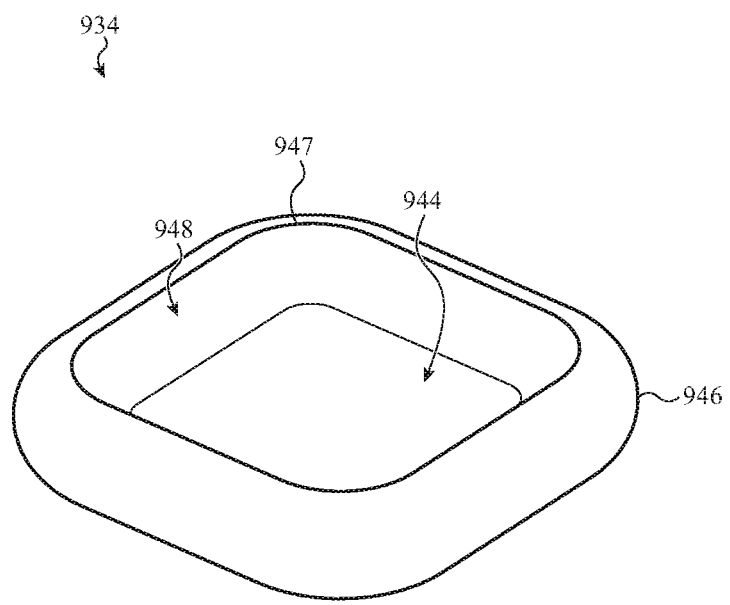
FIG. 9 shows an example of a glass component defining an undercut.

FIG. 9 shows an example of a glass component 934 defining a three-dimensional shape having an undercut. The glass component 934 may be an example of a housing for an electronic device. The glass component 934 defines a substantially planar rear portion 944 and a curved side portion 946 extending from the rear surface and defining an undercut. The undercut may be formed, in part, by deforming the glass workpiece into an appropriately shaped recess of a mold tool.

In the example of FIG. 9, the curved side portion 946 extends around a periphery of the planar rear portion 944 and defines a side wall of the glass component. The substantially planar rear portion 944 and the curved side portion 946 together define a cavity 948 and the curved side portion defines an opening 947 to the cavity. The curved side portion 946 is shaped so that the interior surface of the side wall defines an undercut (e.g., a recessed portion) with respect to the opening 947. The curved side portion 946 may also, in a cross-section along a width of the glass component 934, define a concave curvature. The curved side portion 946 shown in FIG. 9 is shaped so that the exterior surface of the side wall, in a cross-section along a width of the glass component 934, defines a convex curvature. The glass component may have a wall thickness in a range from 300 microns to 2 mm in some embodiments.

FIG. 10 shows an example of a molded glass workpiece 1054 in a mold tool 1072a. The molded glass workpiece 1054 of FIG. 10 may be trimmed to obtain the glass component 934 as previously described with respect to FIGS. 3 and 8. In particular, a peripheral portion 1066 of the molded glass workpiece may be removed to produce a glass component having an undercut, such as previously described with respect to FIG. 9. The shape of the molded glass workpiece 1054 may be produced by using a two-part mold insert for the lower mold tool. FIG. 10 shows one part 1072a of such a two-part mold insert.

In some cases, the molded glass workpiece 1054 is formed by deforming a glass workpiece so that stretching of the glass workpiece occurs. To facilitate stretching of the glass workpiece, a peripheral portion of the glass workpiece may be secured between the first and the second mold tools so that the sliding of the glass workpiece between the mold tools is limited. In some cases, the glass workpiece may be sized to allow for thickness reduction during stretching. To produce a shape having undercut features similar to the shape of the molded glass workpiece 1054, a thickness of the glass workpiece prior to the forming operation may be from about 1 mm to about 3 mm or from about 1.5 mm to about 2.5 mm. The temperature of the portion of the glass being formed may be about equal to the working point. The thickness of the molded portion of the molded glass workpiece may be substantially uniform or may vary in thickness as desired.

FIG. 11 shows a block diagram of a sample electronic device that can incorporate a glass component as described herein. The schematic representation depicted in FIG. 11 may correspond to devices depicted in FIGS. 1A and 1B. However, FIG. 11 may also more generally represent other types of electronic devices with glass components as described herein.

In embodiments, an electronic device 1100 may include sensors 1120 to provide information regarding configuration and/or orientation of the electronic device in order to control the output of the display. For example, a portion of the display 1108 may be turned off, disabled, or put in a low energy state when all or part of the viewable area of the display 1108 is blocked or substantially obscured. As another example, the display 1108 may be adapted to rotate the display of graphical output based on changes in orientation of the device 1100 (e.g., 90 degrees or 180 degrees) in response to the device 1100 being rotated.

The electronic device 1100 also includes a processor 1106 operably connected with a computer-readable memory 1102. The processor 1106 may be operatively connected to the memory 1102 component via an electronic bus or bridge. The processor 1106 may be implemented as one or more computer processors or microcontrollers configured to perform operations in response to computer-readable instructions. The processor 1106 may include a central processing unit (CPU) of the device 1100. Additionally, and/or alternatively, the processor 1106 may include other electronic circuitry within the device 1100 including application specific integrated chips (ASIC) and other microcontroller devices. The processor 1106 may be configured to perform functionality described in the examples above.

The memory 1102 may include a variety of types of non-transitory computer-readable storage media, including, for example, read access memory (RAM), read-only memory (ROM), erasable programmable memory (e.g., EPROM and EEPROM), or flash memory. The memory 1102 is configured to store computer-readable instructions, sensor values, and other persistent software elements.

The electronic device 1100 may include control circuitry 1110. The control circuitry 1110 may be implemented in a single control unit and not necessarily as distinct electrical circuit elements. As used herein, "control unit" will be used synonymously with "control circuitry." The control circuitry 1110 may receive signals from the processor 1106 or from other elements of the electronic device 1100.

As shown in FIG. 11, the electronic device 1100 includes a battery 1114 that is configured to provide electrical power to the components of the electronic device 1100. The battery 1114 may include one or more power storage cells that are linked together to provide an internal supply of electrical power. The battery 1114 may be operatively coupled to power management circuitry that is configured to provide appropriate voltage and power levels for individual components or groups of components within the electronic device 1100. The battery 1114, via power management circuitry, may be configured to receive power from an external source, such as an alternating current power outlet. The battery 1114 may store received power so that the electronic device 1100 may operate without connection to an external power source for an extended period of time, which may range from several hours to several days.

In some embodiments, the electronic device 1100 includes one or more input devices 1118. The input device 1118 is a device that is configured to receive input from a user or the environment. The input device 1118 may include, for example, a push button, a touch-activated button, a capacitive touch sensor, a touch screen (e.g., a touch-sensitive display or a force-sensitive display), a capacitive touch button, a dial, a crown, or the like. In some embodiments, the input device 1118 may provide a dedicated or primary function, including, for example, a power button, volume buttons, home buttons, scroll wheels, and camera buttons.

The device 1100 may also include one or more sensors or sensor modules 1120, such as a force sensor, a capacitive sensor, an accelerometer, a barometer, a gyroscope, a proximity sensor, a light sensor, or the like. In some cases, the device 1100 includes a sensor array (also referred to as a sensing array) which includes multiple sensors 1120. For example, a sensor array associated with a protruding feature of a cover member may include an ambient light sensor, a Lidar sensor, and a microphone. As previously discussed with respect to FIG. 1B, one or more camera modules may also be associated with the protruding feature. The sensors 1120 may be operably coupled to processing circuitry. In some embodiments, the sensors 1120 may detect deformation and/or changes in configuration of the electronic device and be operably coupled to processing circuitry that controls the display based on the sensor signals. In some implementations, output from the sensors 1120 is used to reconfigure the display output to correspond to an orientation or folded/unfolded configuration or state of the device. Example sensors 1120 for this purpose include accelerometers, gyroscopes, magnetometers, and other similar types of position/ orientation sensing devices. In additional examples, the sensors 1120 may include a microphone, an acoustic sensor, a light sensor (including ambient light, infrared (IR) light, and ultraviolet (UV) light), an optical facial recognition sensor, a depth measuring sensor (e.g., a time of flight sensor), a health monitoring sensor (e.g., an electrocardiogram (ERG) sensor, a heart rate sensor, a photoplethysmogram (PPG) sensor, and/or a pulse oximeter), a biometric sensor (e.g., a fingerprint sensor), or other types of sensing device.

In some embodiments, the electronic device 1100 includes one or more output devices 1104 configured to provide output to a user. The output device 1104 may include a display 1108 that renders visual information generated by the processor 1106. The output device 1104 may also include one or more speakers to provide audio output. The output device 1104 may also include one or more haptic devices that are configured to produce a haptic or tactile output along an exterior surface of the device 1100.

The display 1108 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1108 is a liquid-crystal display or an electrophoretic ink display, the display 1108 may also include a backlight component that can be controlled to provide variable levels of display brightness. If the display 1108 is an organic light-emitting diode or an organic electroluminescent-type display, the brightness of the display 1108 may be controlled by modifying the electrical signals that are provided to display elements. In addition, information regarding configuration and/or orientation of the electronic device may be used to control the output of the display as described with respect to input devices 1118. In some cases, the display is integrated with a touch and/or force sensor in order to detect touches and/or forces applied along an exterior surface of the device 1100.

The electronic device 1100 may also include a communication port 1112 that is configured to transmit and/or receive signals or electrical communication from an external or separate device. The communication port 1112 may be configured to couple to an external device via a cable, adaptor, or other type of electrical connector. In some embodiments, the communication port 1112 may be used to couple the electronic device 1100 to a host computer.

The electronic device 1100 may also include at least one accessory 1116, such as a camera, a flash for the camera, or other such device. The camera may be part of a camera assembly that may be connected to other parts of the electronic device 1100 such as the control circuitry 1110.

As used herein, the phrase "one or more of" preceding a series of items, with the term "and" or "or" to separate any of the items, modifies the list as a whole, rather than each member of the list. The phrase "one or more of" does not require selection of at least one of each item listed; rather, the phrase allows a meaning that includes at a minimum one of any of the items, and/or at a minimum one of any combination of the items, and/or at a minimum one of each of the items. By way of example, the phrases "one or more of A, B, and C" or "one or more of A, B, or C" each refer to only A, only B, or only C; any combination of A, B, and C; and/or one or more of each of A, B, and C. In addition, as used herein the phrase "one or more of" preceding a series of items, with the term "and" or "or" separating the items, does not require selection of one of each item listed; rather, the phrase allows a meaning that includes at a minimum one of any of the items, and/or at a minimum one of any combination of the items, and/or at a minimum one of each of the items. Similarly, it may be appreciated that an order of elements presented for a conjunctive or disjunctive list provided herein should not be construed as limiting the disclosure to only that order provided.

As used herein, the terms "about," "approximately," "substantially," "generally," "similar," and the like are used to account for relatively small variations, such as a variation of +/−10%, +/−5%, +/−2%, or +/−1%. In addition, use of the term "about" in reference to the endpoint of a range may signify a variation of +/−10%, +/−5%, +/−2%, or +/−1% of the endpoint value. In addition, disclosure of a range in which at least one endpoint is described as being "about" a specified value includes disclosure of the range in which the endpoint is equal to the specified value.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A method for making a glass component for an electronic device, the method comprising:
   heating each of a first and a second mold tool to a first temperature;
   positioning a glass workpiece between the first mold tool and the second mold tool, the second mold tool defining an opening positioned over the glass workpiece and the first mold tool defining a recess feature positioned below the glass workpiece;
   securing the first mold tool with the second mold tool to form a sealed interface at a parting line between the first mold tool and the second mold tool;
   introducing a forming liquid at a second temperature into the opening;
   pressurizing the forming liquid causing the glass workpiece to deform into the recess feature and against an undercut portion of the first mold tool that partly defines the recess feature, the second temperature being greater than the first temperature;
   depressurizing and removing the forming liquid from the opening;
   separating the first mold tool and the second mold tool and removing a molded glass workpiece, an interior surface of the molded glass workpiece defining a cavity and including an undercut region; and finishing the molded glass workpiece to produce the glass component.

2. The method of claim 1, wherein:
the forming liquid comprises molten tin; and
the operation of pressurizing the forming liquid comprises introducing a pressurized gas to a region of the forming liquid, the pressurized gas introduced at a pressure ranging from 0.25 MPa to 0.75 MPa.

3. The method of claim 1, wherein the operation of securing the first mold tool with the second mold tool further comprises slidably sealing the glass workpiece to the second mold tool.

4. The method of claim 1, wherein the operation of securing the first mold tool with the second mold tool further comprises providing a sealing element between the first mold tool and the second mold tool.

5. The method of claim 1, wherein the glass component defines an internal undercut portion defined at least in part by the undercut region of the molded glass workpiece.

6. The method of claim 1, wherein:
the first temperature is in a range from a strain point to a softening point of the glass workpiece;
the second temperature is in a range from greater than or equal to a working point to less than a melting point of the glass workpiece; and
each of the first mold tool and the second mold tool is heated to a temperature less than or equal to a glass transition temperature of the glass workpiece.

7. The method of claim 1, wherein the operation of finishing the molded glass workpiece comprises trimming a peripheral portion of the molded glass workpiece.

8. A method for making a glass component for an electronic device, the method comprising:
heating a first mold tool and a second mold tool of a mold to a first temperature, an interior surface of the first mold tool defining a recess feature;
positioning a glass workpiece within the mold, a portion of the glass workpiece at least partially defining a fluid seal between the first mold tool and the second mold tool;
introducing a heated fluid into the mold, the heated fluid in contact with a first surface of the glass workpiece, the heated fluid at a second temperature, greater than the first temperature;
pressurizing the heated fluid thereby causing a second surface of the glass workpiece opposite to the first surface to deform into the recess feature and against an undercut region of the interior surface of the first mold tool of the second meld tool, thereby forming a molded glass workpiece that defines an interior cavity and that comprises an undercut portion;
depressurizing and draining the heated fluid from the mold;
removing the molded glass workpiece from the mold; and
finishing the molded glass workpiece to produce the glass component.

9. The method of claim 8, wherein the heated fluid is one or more of: a molten tin or a molten salt.

10. The method of claim 8, wherein the first mold tool contacts the second mold tool along a seal interface surrounding the glass workpiece.

11. The method of claim 8, wherein the heated fluid is pressurized to a pressure less than or equal to 1 MPa above atmospheric pressure.

12. The method of claim 8, wherein the operation of positioning the glass workpiece within the mold further comprises including a sealing element between the glass workpiece and the second mold tool to form the fluid seal.

13. The method of claim 8, wherein the operation of positioning the glass workpiece within the mold further comprises pressing the second mold tool against the glass workpiece to form the fluid seal.

14. The method of claim 8, wherein the glass workpiece is a sheet of an aluminosilicate glass and the sheet has a thickness from 300 microns to about 2 mm.

* * * * *